United States Patent … US 9,753,801 B2
Ishii et al. … Sep. 5, 2017

(54) DETECTION METHOD AND INFORMATION PROCESSING DEVICE

(71) Applicant: FUJITSU LIMITED, Kawasaki-shi, Kanagawa (JP)

(72) Inventors: Hiroaki Ishii, Toyama (JP); Shinichi Omura, Kanazawa (JP); Shoshin Oiwa, Yokohama (JP); Michiaki Sumiya, Kaga (JP); Jiro Ikegami, Toyama (JP); Rie Takeuchi, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/284,128

(22) Filed: Oct. 3, 2016

(65) Prior Publication Data

US 2017/0097863 A1 Apr. 6, 2017

(30) Foreign Application Priority Data

Oct. 5, 2015 (JP) ................................ 2015-197554

(51) Int. Cl.
G06F 11/00 (2006.01)
G06F 11/07 (2006.01)
G06F 17/30 (2006.01)

(52) U.S. Cl.
CPC ........ *G06F 11/079* (2013.01); *G06F 11/0754* (2013.01); *G06F 17/30598* (2013.01)

(58) Field of Classification Search
USPC ............................................... 714/47.1, 47.2
See application file for complete search history.

(56) References Cited

U.S. PATENT DOCUMENTS

| 6,735,550 | B1* | 5/2004 | Weekley ............. G06K 9/6217 702/182 |
| 2010/0050025 | A1* | 2/2010 | Grichnik ............... G05B 17/02 714/47.2 |
| 2013/0198380 | A1 | 8/2013 | Oono |
| 2013/0274899 | A1 | 10/2013 | Hamzaoui et al. |
| 2013/0318011 | A1 | 11/2013 | Jones et al. |
| 2014/0343966 | A1* | 11/2014 | Miyoshi ................ G06Q 40/08 705/3 |

FOREIGN PATENT DOCUMENTS

| JP | 2013246818 A | 12/2013 |
| WO | 2012067031 A1 | 5/2012 |
| WO | 2012090718 A1 | 7/2012 |

\* cited by examiner

*Primary Examiner* — Sarai Butler
(74) *Attorney, Agent, or Firm* — Westerman, Hattori, Daniels & Adrian, LLP

(57) ABSTRACT

A method includes generating a plurality of pieces of correlation information based on correlations between changes in each item in each of different pairs of items in a plurality of items per unit period of time in a time series, each item relating to at least one of an operation, a performance, or a load in a computer system, each of the plurality of pieces of correlation information being generated for the plurality of items in one unit period of time in the time series, clustering the plurality of pieces of correlation information into a plurality of clusters, each cluster representing a state of the computer system and including a subset of the plurality of pieces of correlation information meeting a threshold for similarity, generating transition probabilities between each pair of the plurality of clusters, and determining an anomaly in the computer system based on the transition probability.

20 Claims, 22 Drawing Sheets

| TIME | CLUSTER ID | | | |
|---|---|---|---|---|
| | 1 | 2 | ... | M |
| $T_1$ | $P_{1,1}$ | $P_{1,2}$ | | $P_{1,M}$ |
| $T_2$ | $P_{2,1}$ | $P_{2,2}$ | | $P_{2,M}$ |
| ⋮ | | | | |
| $T_k$ | $P_{k,1}$ | $P_{k,2}$ | | $P_{k,M}$ |

151b

| | | TRANSITION SOURCE CLUSTER ID | | | |
|---|---|---|---|---|---|
| | | 1 | 2 | ... | M |
| TRANSITION DESTINATION CLUSTER ID | 1 | $D_{1,1}$ | $D_{1,2}$ | | $D_{1,M}$ |
| | 2 | $D_{2,1}$ | $D_{2,2}$ | | $D_{2,M}$ |
| | ⋮ | | | | |
| | M | $D_{M,1}$ | $D_{M,2}$ | | $D_{M,M}$ |

151c

| CLUSTER ID | SDR | | |
|---|---|---|---|
| 1 | DATE AND TIME : yy:dd:ss, SDR=(1,0,⋯) | DATE AND TIME : yy:dd:ss, SDR=(1,0,⋯) | ... |
| 2 | DATE AND TIME : yy:dd:ss, SDR=(0,1,⋯) | DATE AND TIME : yy:dd:ss, SDR=(0,1,⋯) | ... |
| ⋮ | ⋮ | ⋮ | ⋮ |
| M | DATE AND TIME : yy:dd:ss, SDR=(1,1,⋯) | DATE AND TIME : yy:dd:ss, SDR=(1,1,⋯) | ... |

FIG. 16
PRELIMINARY LEARNING RESULT
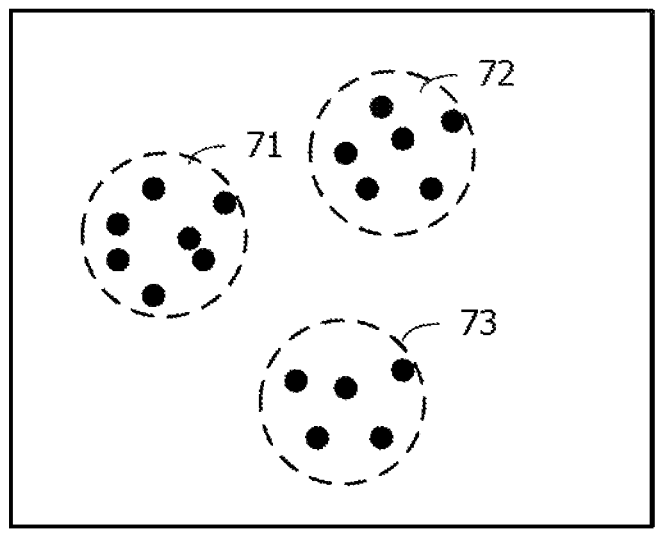
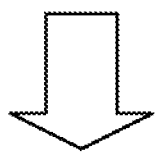
AFTER ONLINE IDENTIFICATION
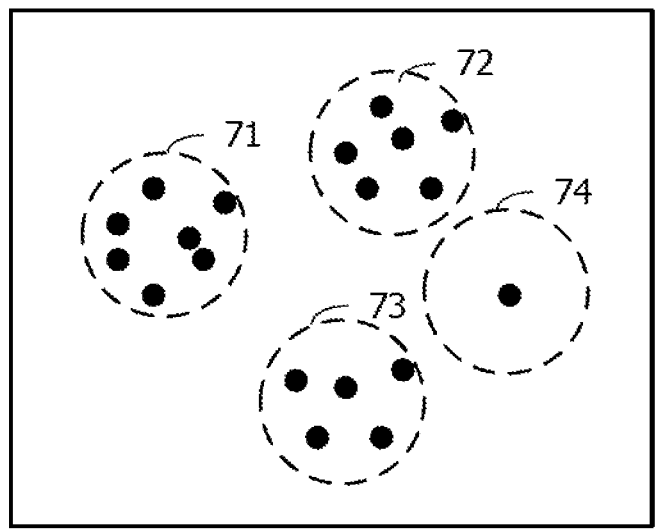
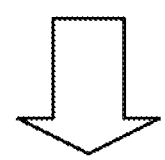
STATE ANOMALY

DETECTION METHOD AND INFORMATION PROCESSING DEVICE

CROSS-REFERENCE TO RELATED APPLICATION

This application is based upon and claims the benefit of priority of the prior Japanese Patent Application No. 2015-197554, filed on Oct. 5, 2015, the entire contents of which are incorporated herein by reference.

FIELD

The embodiments discussed herein are related to a technique for evaluating an anomaly.

BACKGROUND

The current information and technology (IT) system (hereinafter, referred to simply as the system) includes a large number of devices such as servers, storage devices, and network devices. Furthermore, an observing device that observes the operating status of the system is also included in the system. The observing device obtains a huge amount of time-series data from the large number of devices included in the system in order to determine whether the system is normally operating. For example, the observing device obtains information relating to the statuses of use of a central processing unit (CPU) and a memory of each server and displays time change of the statuses of use on a monitor by a graph. However, when the amount of displayed items becomes very large, it becomes difficult for an operation administrator to visually check the items and recognize the occurrence of an abnormal state.

Therefore, there has been devised a method for efficiently determining the kind, occurrence place, and cause of an abnormality or assisting the determination in a complex system (for example, International Publication Pamphlet No. WO 2012/090718). Furthermore, there has also been devised a method for alleviating the work load in setting a condition for determining whether the current state is the state in which a predictor of a service level breach in a system appears (for example, International Publication Pamphlet No. WO 2012/067031). Moreover, there has also been devised a method for detecting an anomaly in multivariate time-series data acquired by a sensor of equipment for monitoring the equipment state (for example, Japanese Laid-open Patent Publication No. 2013-246818).

SUMMARY

According to an aspect of the embodiment, a method for detecting an anomaly in a computer system includes generating a plurality of pieces of correlation information based on correlations between changes in each item in each of different pairs of items in a plurality of items per unit period of time in a time series, each item relating to at least one of an operation, a performance, or a load in the computer system, each of the plurality of pieces of correlation information being generated for the plurality of items in one unit period of time in the time series, clustering the plurality of pieces of correlation information into a plurality of clusters, each cluster representing a state of the computer system and including a subset of the plurality of pieces of correlation information meeting a threshold for similarity, generating transition probabilities between each pair of the plurality of clusters, and determining the anomaly in the computer system based on the transition probability from one of the plurality of clusters in a first unit period of time to another one of the plurality of clusters in a second unit period of time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating one example of a learning result;

FIG. 16 is a diagram illustrating a first example of a state anomaly;

DESCRIPTION OF EMBODIMENTS

For example, an existing observing device monitors whether or not a measurement value surpasses a threshold for each single measurement item and determines that an abnormality exists if the measurement value surpasses the threshold. However, among the abnormal states of the system, there are abnormalities in which the measurement value surpasses the threshold in none of the measurement items (silent anomaly). Such abnormalities are difficult to detect through item-by-item monitoring. Therefore, it is difficult to correctly detect the abnormal state of the system in some cases.

In one aspect, techniques disclosed in the embodiments discussed herein intend to improve the detection accuracy of the abnormal state of a system.

The embodiments will be described below with reference to the drawings. Each embodiment can be carried out by combining plural embodiments within a consistent range.

First Embodiment

First, a first embodiment will be described. In the first embodiment, an information processing device generates correlation information indicating the state of a system in each unit period on the basis of the correlation of time change of a value among plural items of the system. Then, the information processing device carries out clustering of the plural pieces of correlation information. At this time, the "state of the system" can be identified with the "cluster" and the state change of the system can be properly monitored due to which cluster the generated correlation information belongs to.

Figure 1:
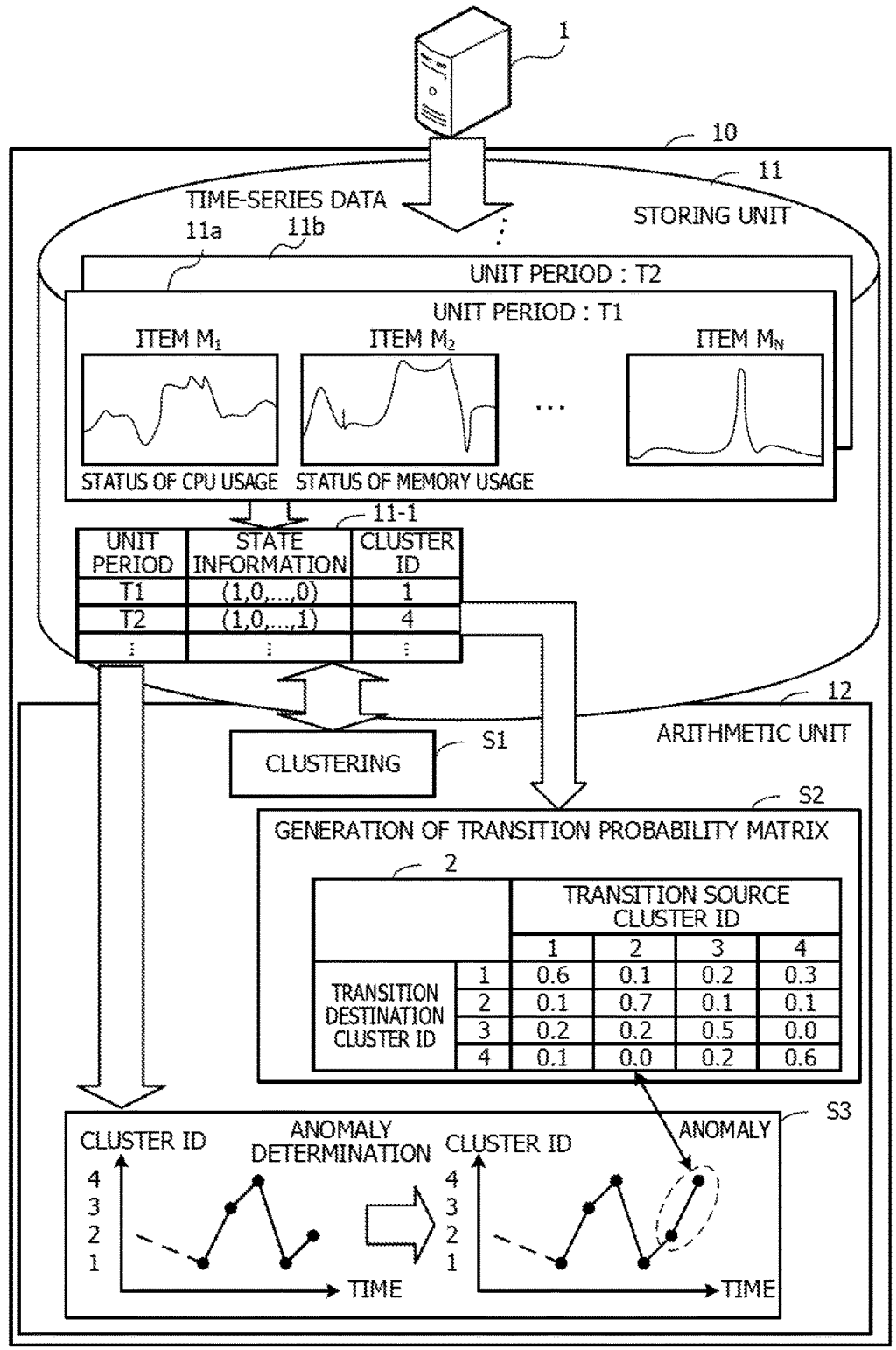
FIG. 1 is a diagram illustrating a configuration example of an information processing device according to a first embodiment.

FIG. 1 is a diagram illustrating a configuration example of the information processing device according to the first embodiment. An information processing device 10 is coupled to a system 1 as a management target via a network for example. The system 1 is a computer system including plural servers and plural storage devices for example. The information processing device 10 monitors the operating status of the system 1 and detects the occurrence of an abnormal state that possibly becomes a predictor of failure. For this purpose, the information processing device 10 includes a storing unit 11 and an arithmetic unit 12.

The storing unit 11 stores pieces 11a, 11b, . . . of time-series data representing time change in every unit period regarding the values of plural items indicating the state of the system 1. For example, the information processing device 10 monitors the system 1 and acquires, from the system 1, the pieces 11a, 11b, . . . of time-series data of the values of the plural items ($M_1$, $M_2$, . . . , $M_N$) indicating the state of the system 1 as the management target to store the pieces 11a, 11b, . . . of time-series data in the storing unit 11. The plural items indicating the state of the system 1 are items relating to the performance or load of the system 1, such as the status of use of a CPU and the status of use of a memory, for example.

Furthermore, the storing unit 11 stores a state management table 11-1. In the state management table 11-1, pieces of state information calculated on the basis of the pieces 11a, 11b, . . . of time-series data of each unit period are registered. The state information is information indicating the correlations of time change of the value among the plural items for example. The state information indicating the correlations is represented by a vector including plural elements taking a value of "0" or "1" for example. In this case, each element in the vector corresponds to a pair of two items, and the value is "1" if a correlation exists between the items in the pair and the value is "0" if a correlation does not exist. Moreover, cluster identifications (IDs) of the clusters to which the respective pieces of state information belong are set in the state management table 11-1.

The arithmetic unit 12 carries out clustering under a given condition for the state information indicating the state of the system 1 as the management target regarding each of plural unit periods consecutive in the time series (step S1). For example, the arithmetic unit 12 causes pieces of state information whose similarity is equal to or higher than a given threshold to belong to the same cluster. In this case, the arithmetic unit 12 carries out the clustering in such a manner that state information belonging to a certain cluster has similarities equal to or higher than the threshold with all other pieces of state information belonging to this cluster. The arithmetic unit 12 sets the identifiers (cluster IDs) of the clusters to which the respective pieces of state information belong in the state management table 11-1.

Next, the arithmetic unit 12 deems each of the plural clusters generated by the clustering as the transition source and transition destination of the state. Then, on the basis of time change of the cluster to which the state information of each of the plural unit periods belongs, the arithmetic unit 12 generates a transition probability matrix 2 indicating the transition probability of the state of the system 1 from the transition source to the transition destination regarding each pair of the transition source and the transition destination (step S2). For example, suppose that the state information of a certain unit period belongs to a cluster with a cluster ID "1." In this case, according to the transition probability matrix 2 illustrated in FIG. 1, the probability with which the state information of the next unit period belongs to the cluster with the cluster ID "1" is "60%" and the probability of belonging to a cluster with a cluster ID "2" is "10%." In addition, the probability of belonging to a cluster with a cluster ID "3" is "20%" and the probability of belonging to a cluster with a cluster ID "4" is "10%."

Next, the arithmetic unit 12 specifies a first unit period employed as the determination target of an anomaly and a second unit period later than the first unit period among the plural unit periods. The first unit period and the second unit period are unit periods consecutive on the time series for example. Then, on the basis of the transition probability matrix 2, the arithmetic unit 12 determines whether or not the transition of the state of the system 1 from the state indicated by the state information of the first unit period to the state indicated by the state information of the second unit period is an anomaly (step S3). For example, the arithmetic unit 12 carries out clustering of state information based on time-series data newly acquired, and acquires the cluster ID of the cluster to which this state information belongs. Then, the arithmetic unit 12 determines that an anomaly has occurred if the probability of transition from the cluster to which the state information in the previous unit period belongs to the cluster to which the state information in the latest unit period belongs is very low. For example, in the example of FIG. 1, the state information in the previous unit period belongs to the cluster with the cluster ID "2." Suppose that it is determined that the state information in the latest unit period belongs to the cluster with the cluster ID "4" as a result of clustering of this state information. According to the transition probability matrix 2, the probability of transition from the cluster with the cluster ID "2" to the cluster with the cluster ID "4" is "0.0." In this case, the possibility that the state of the system 1 indicated in the latest state information is an abnormal state is high, and it is determined that the state is an anomaly.

According to such an information processing device 10, the occurrence of an abnormal state can be detected on the basis of the transition status of the state of the system 1. For this reason, for example, a deviation of the system 1 from the normal state can be detected even when the value of each item of the pieces 11a, 11b, . . . of time-series data does not surpasses the threshold. In addition, the occurrence of state transition that hardly occurs normally can be detected by determining whether the state is an anomaly on the basis of the transition status of the state.

For example, suppose that normally a backup of data is taken in the system 1 after operation stop. In this case, normally the state of the system 1 makes transition of "operating state (high-load state)"→"backup executing state"→"operation stop (low-load) state." However, if the state makes transition from the "operating state" to the "operation stop state" without going through the "backup executing state," it is conceivable that any abnormality is caused in the system 1. Here, the "operating state," the "backup executing state," and the "operation stop state" are different from each other in the part to which the load is applied, and the clusters to which generated state information belongs in the respective states are also different. Therefore, if the state of the system 1 makes transition from the "operating state" to the "operation stop state," the information processing device 10 can detect the occurrence of state transition whose occurrence probability is low and determine that the state is an anomaly through clustering and anomaly determination.

Due to the capability of detecting an anomaly on the basis of the transition status of the state in this manner, the detection accuracy of an abnormal state is improved. If the system 1 becomes a state that has not occurred thus far, a new cluster is generated by clustering and the state information indicating this state belongs to the newly-generated cluster. Also in the case in which the state whose occurrence probability is so low that a new cluster is generated occurs as above, the state may be detected as an anomaly. As above, the detection accuracy of an abnormal state can be further enhanced by combining various anomaly detection methods.

In the anomaly determination, the arithmetic unit 12 compares the cluster IDs of the clusters to each of which the state information of a respective one of two unit periods consecutive on the time series belongs and determines whether or not the state is an anomaly for example. Furthermore, it is also possible for the arithmetic unit 12 to employ plural unit periods as first unit periods (unit periods before transition) in the anomaly determination. In this case, the arithmetic unit 12 employs a unit period later than all of the plural first unit periods as a second unit period (unit period after transition).

If plural unit periods are employed as the first unit periods, transition probabilities each corresponding to a respective one of the plural first unit periods are used for the anomaly determination. For example, regarding each of the plural first unit periods, the arithmetic unit 12 acquires, from the transition probability matrix 2, the transition probability corresponding to the pair of a first cluster to which the state information of the first unit period belongs and a second cluster to which the state information of the second unit period belongs.

Next, on the basis of the transition probabilities each corresponding to a respective one of the plural first unit periods, the arithmetic unit 12 calculates an evaluation value indicating the possibilities of the transition of the state of the system 1 from the states each indicated by a respective one of pieces of state information of the plural first unit periods to the state indicated by the state information of the second unit period. Then, the arithmetic unit 12 determines whether or not the state is an anomaly on the basis of the evaluation value. By determining whether or not the state of the system 1 in the second unit period is an anomaly on the basis of plural first unit periods in this manner, the detection accuracy of an abnormal state can be improved. In the calculation of the evaluation value, for example, the arithmetic unit 12 carries out a higher weighting for the transition probability acquired according to the first unit period when the time difference between the first unit period and the second unit period is smaller, and calculates the evaluation value. This can enhance the reliability of the evaluation value.

As a detection example of the anomaly, it is also possible to detect a deviation from stationarity as an anomaly for example. In this case, for example, the arithmetic unit 12 specifies, from the whole period including plural unit periods, a first period that is at least part of the whole period and a second period that is at least part of the whole period and is different from the first period. For example, the arithmetic unit 12 employs the former half obtained by bisecting the whole period as the first period and employs the latter half as the second period. Next, on the basis of time change of the clusters to each of which the state information of a respective one of the unit periods included in the first period belongs, the arithmetic unit 12 generates a first transition probability matrix indicating the transition probability of the state of the system 1 from the transition source to the transition destination regarding each pair of the transition source and the transition destination. Similarly, on the basis of time change of the clusters to each of which the state information of a respective one of the unit periods included in the second period belongs, the arithmetic unit 12 generates a second transition probability matrix indicating the transition probability of the state of the system 1 from the transition source to the transition destination regarding each pair of the transition source and the transition destination. Then, the arithmetic unit 12 determines whether or not the state is an anomaly on the basis of whether or not a significant difference exists between the first transition probability matrix and the second transition probability matrix.

For example, in some cases, the arithmetic unit 12 knows that a significant difference does not exist between the first transition probability matrix generated about the first period and the second transition probability matrix generated about the second period when the system 1 is in the normal state. That the similar transition probability matrices are generated although the period as the generation target of the transition probability matrix is different is equivalent to that the stationarity exists. In the case in which the stationarity exists when the system 1 is in the normal state, a deviation from the stationarity exists if a significant difference is generated between the first transition probability matrix and the second transition probability matrix. If a deviation from the stationarity exists, there is a possibility that an abnormality is caused in the system 1, and therefore the arithmetic unit 12 determines that the state is an anomaly. Due to the capability of detecting an anomaly on the basis of a deviation from the stationarity in this manner, the detection accuracy of an abnormal state is further improved.

The arithmetic unit 12 can be implemented by a processor possessed by the information processing device 10 for example. Furthermore, the storing unit 11 can be implemented by a memory or a storage device possessed by the information processing device 10 for example.

Second Embodiment

Next, a second embodiment will be described.

Figure 2:
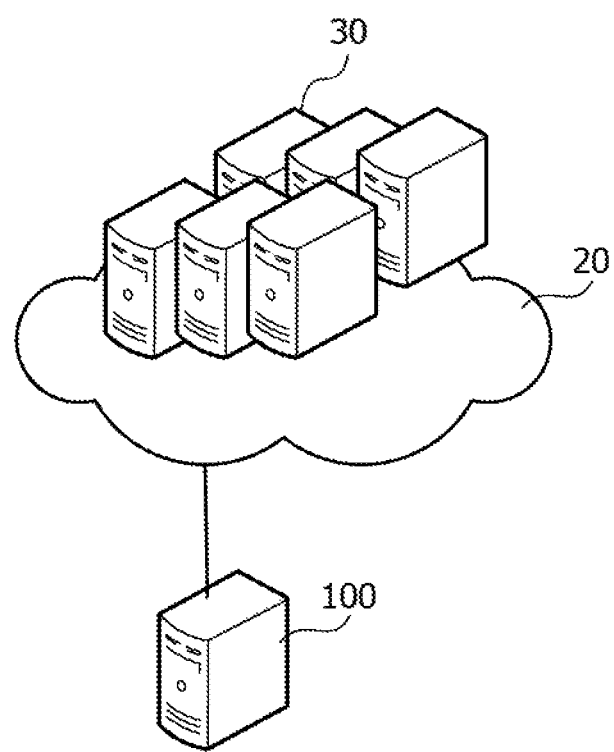
FIG. 2 is a diagram illustrating a system configuration example of a second embodiment.

FIG. 2 is a diagram illustrating a system configuration example of the second embodiment. A system 30 is coupled to an observing device 100 via a network 20. The system 30 is an ICT system including devices such as servers, storage devices, and network equipment. The observing device 100 acquires information indicating the operating status from the system 30 and monitors the operation of the system 30 on the basis of the acquired information.

Figure 3:
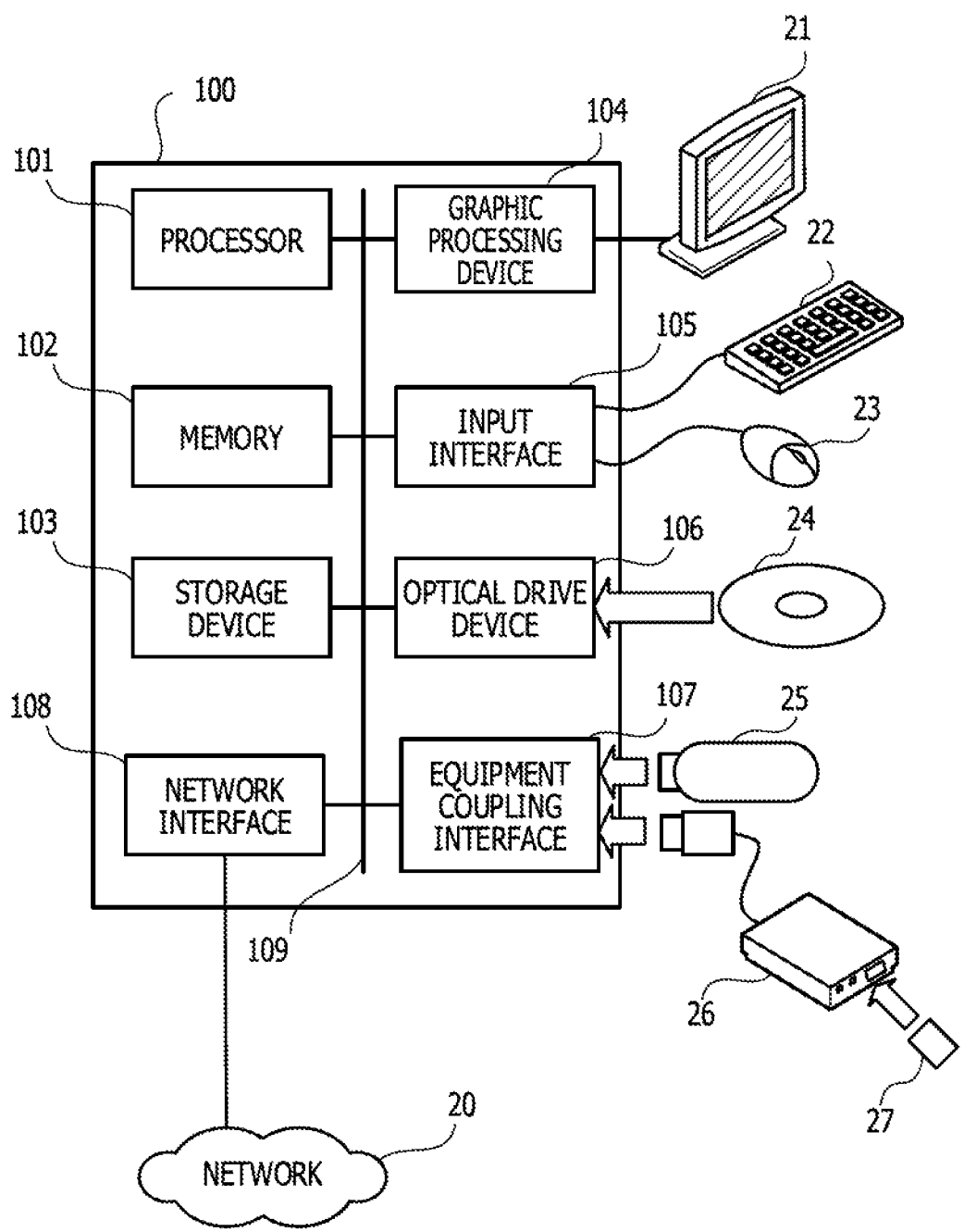
FIG. 3 is a diagram illustrating one configuration example of hardware of an observing device.

FIG. 3 is a diagram illustrating one configuration example of hardware of the observing device. The whole of the observing device 100 is controlled by a processor 101. To the processor 101, a memory 102 and plural pieces of peripheral equipment are coupled via a bus 109. The processor 101 may be a multiprocessor. The processor 101 is a CPU, a micro processing unit (MPU), or a digital signal processor (DSP) for example. At least part of functions implemented through execution of a program by the processor 101 may be implemented by an electronic circuit such as an application specific integrated circuit (ASIC) or a programmable logic device (PLD).

The memory 102 is used as a main memory device of the observing device 100. In the memory 102, at least part of a program of an operating system (OS) and application programs to be executed by the processor 101 is temporarily stored. Furthermore, various kinds of data for processing by the processor 101 are stored in the memory 102. As the memory 102, a volatile semiconductor memory device such as a random access memory (RAM) is used for example.

As the pieces of peripheral equipment coupled to the bus 109, there are a storage device 103, a graphic processing device 104, an input interface 105, an optical drive device 106, an equipment coupling interface 107, and a network interface 108.

The storage device 103 carries out data writing and reading electrically or magnetically with respect to a built-in storing medium. The storage device 103 is used as an auxiliary memory device of the computer. In the storage device 103, the program of the OS, the application programs, and various kinds of data are stored. As the storage device 103, a hard disk drive (HDD) or a solid state drive (SSD) can be used for example.

A monitor 21 is coupled to the graphic processing device 104. The graphic processing device 104 displays images on the screen of the monitor 21 in accordance with a command from the processor 101. As the monitor 21, a display device using a cathode ray tube (CRT), a liquid crystal display device, and so forth are available.

A keyboard 22 and a mouse 23 are coupled to the input interface 105. The input interface 105 transmits signals sent from the keyboard 22 and the mouse 23 to the processor 101. The mouse 23 is one example of a pointing device and it is also possible to use other pointing devices. As other pointing devices, a touch panel, a tablet, a touchpad, a trackball, and so forth are available.

The optical drive device 106 reads data recorded on an optical disc 24 by using laser light or the like. The optical disc 24 is a portable recording medium on which data is so recorded as to be allowed to be read by light reflection. As the optical disc 24, a digital versatile disc (DVD), a DVD-RAM, a compact disc read only memory (CD-ROM), a CD-R (Recordable)/RW (ReWritable), and so forth are available.

The equipment coupling interface 107 is a communication interface for coupling peripheral equipment to the observing device 100. For example, a memory device 25 and a memory reader/writer 26 can be coupled to the equipment coupling interface 107. The memory device 25 is a recording medium equipped with a function of communications with the equipment coupling interface 107. The memory reader/writer 26 is a device that carries out data writing to a memory card 27 or data reading from the memory card 27. The memory card 27 is a card-type recording medium.

The network interface 108 is coupled to the network 20. The network interface 108 carries out transmission and reception of data with another computer or communication equipment via the network 20.

By the above-described hardware configuration, the processing functions of the second embodiment can be implemented. The information processing device 10 illustrated in the first embodiment can also be implemented by hardware similar to that of the observing device 100 illustrated in FIG. 3.

The observing device 100 implements the processing functions of the second embodiment by executing a program recorded on a computer-readable recording medium for example. The program in which the contents of processing to be executed by the observing device 100 are described can be recorded on various recording media. For example, the program to be executed by the observing device 100 can be stored in the storage device 103. The processor 101 loads at least part of the program in the storage device 103 into the memory 102 and executes the program. Furthermore, it is also possible to record the program to be executed by the observing device 100 on a portable recording medium such as the optical disc 24, the memory device 25, or the memory card 27. The program stored in the portable recording medium is installed on the storage device 103 by control from the processor 101 for example and then becomes executable. Furthermore, it is also possible for the processor 101 to directly read out the program from the portable recording medium and execute the program.

By the observing device 100 with such hardware, the state of the system 30 is observed through the network 20.

Figure 4:
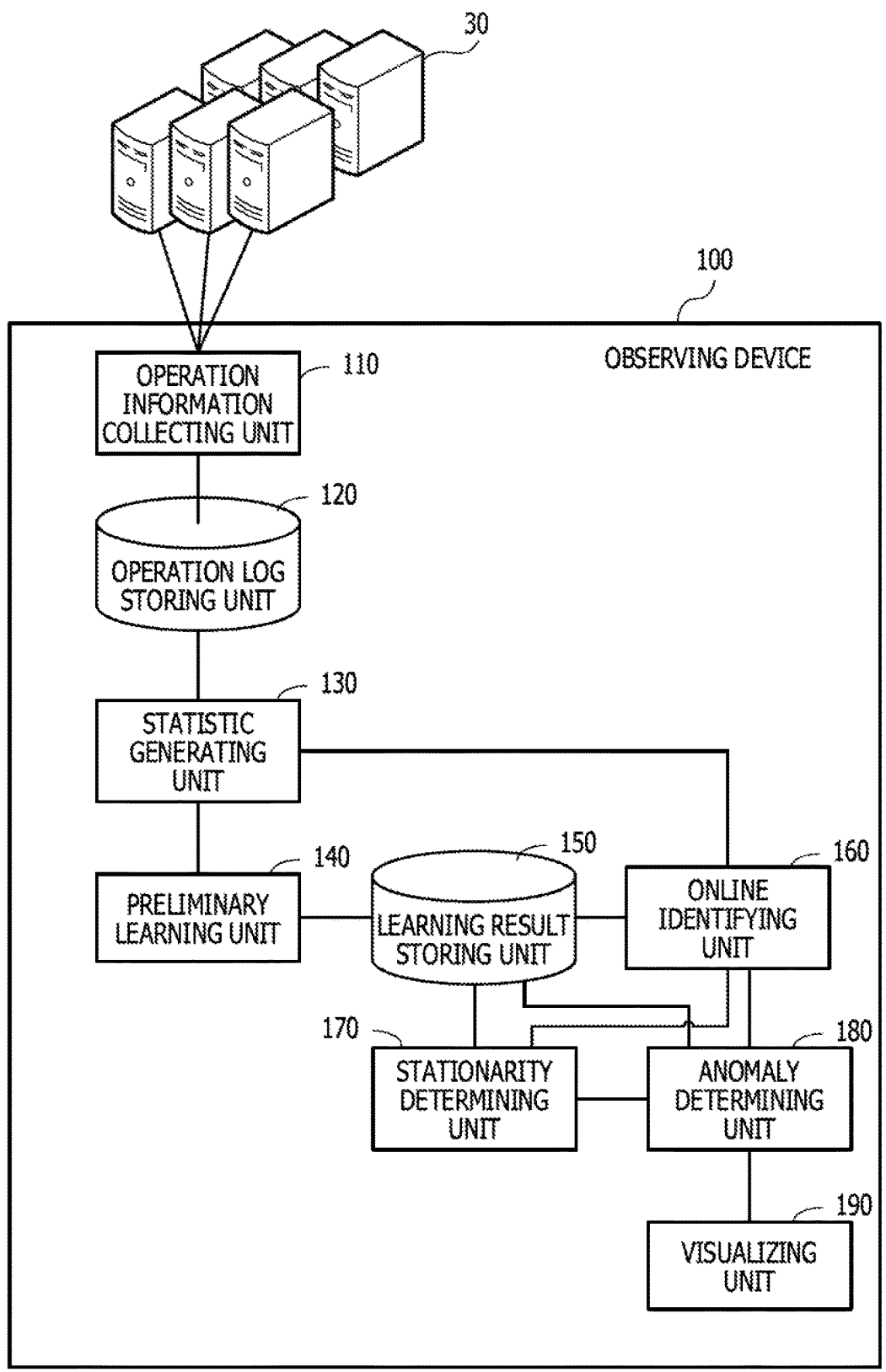
FIG. 4 is a block diagram illustrating functions of an observing device.

FIG. 4 is a block diagram illustrating functions of the observing device. The observing device 100 includes an operation information collecting unit 110, an operation log storing unit 120, a statistic generating unit 130, a preliminary learning unit 140, a learning result storing unit 150, an online identifying unit 160, a stationarity determining unit 170, an anomaly determining unit 180, and a visualizing unit 190.

The operation information collecting unit 110 collects pieces of operation information from the devices in the system 30. For example, the operation information collecting unit 110 transmits a command for information collection (sar command and so forth) to each device in the system 30. Along with this, the operation information is returned from each device. The operation information collecting unit 110 stores collected pieces of operation information in the operation log storing unit 120 as operation logs. As the collection method of the operation information by the operation information collecting unit 110, a "real-time system" and a "batch system" are conceivable. The "real-time system" is a system in which pieces of data are collected in real time from each device configuring the system 30. The "batch system" is a system in which pieces of past operation information accumulated in the storage device in the system 30 are collectively input from this storage device.

The operation log storing unit 120 stores the logs of the pieces of operation information collected from the devices in the system 30 (operation logs). For example, part of the storing area of the storage device 103 is used as the operation log storing unit 120.

The statistic generating unit 130 analyzes the operation log in the operation log storing unit 120 and generates a multi-dimensional statistic (SDR). The SDR is information representing the state of the system 30 due to the correlations between all item pairs that can be acquired from plural items relating to the operation of the system 30. The SDR is generated for each unit period.

The preliminary learning unit 140 learns the SDR representing the normal state of the system 30 on the basis of the generated time-series SDRs. For example, the preliminary learning unit 140 analyzes what state of the SDR the system 30 readily becomes. Furthermore, the preliminary learning unit 140 analyzes what state of the SDR the system 30 readily makes transition to in the next time zone when the system 30 is in a state of a specific SDR in a certain time zone. In the case of analyzing the SDR, the preliminary learning unit 140 generates clusters by clustering SDRs generated on each unit period basis for example. The clustering carried out by the preliminary learning unit 140 is static similarity clustering based on the similarity of accumulated SDRs.

The preliminary learning unit 140 deems states indicated by SDRs belonging to the same cluster as the same state. The preliminary learning unit 140 stores a learning result in the learning result storing unit 150. The preliminary learning unit 140 executes the processing when the observing device 100 is operating in a preliminary learning mode for example. The preliminary learning mode is a mode for learning the normal state of the system 30.

The learning result storing unit 150 stores the learning result by the preliminary learning. For example, part of the storing area of the memory 102 or the storage device 103 is used as the learning result storing unit 150.

The online identifying unit 160 identifies which cluster indicated by the learning result obtained by the preliminary learning the SDR based on an operation log of the system 30 collected in real time belongs to. It is also possible for the online identifying unit 160 to update the learning result in the learning result storing unit 150 on the basis of the SDR discriminated in real time. The online identifying unit 160 executes the processing when the observing device 100 is operating in an operation diagnostic mode for example. The operation diagnostic mode is a mode for making a diagnosis of whether or not the state of the system 30 is the normal state.

The stationarity determining unit 170 statistically analyzes the learning result and determines whether or not the stationarity in the state of the system 30 exists. For example, the stationarity determining unit 170 divides a learning period into plural periods and compares pieces of specific statistical information in a respective one of the segmented periods obtained by the dividing. If a significant difference is not detected, the stationarity determining unit 170 determines that the stationarity exists (change due to the difference in the period is not caused) regarding the statistical information.

The anomaly determining unit 180 determines whether or not an anomaly has occurred on the basis of the learning result by preliminary learning, the identification result by online identification, whether or not the stationarity of statistical information exists, and so forth. For example, the anomaly determining unit 180 calculates an anomaly score as a determination index (evaluation value) about whether an anomaly has occurred. The anomaly determining unit 180 determines that an anomaly has occurred if the anomaly score is equal to or larger than a given value.

The visualizing unit 190 displays the occurrence status of the anomaly on the monitor 21 or the like. For example, the visualizing unit 190 displays the anomaly occurrence time on the monitor 21. Furthermore, the visualizing unit 190 displays time change of the values of the respective performance items at the anomaly occurrence time on the monitor 21 for example.

Due to such functions, the observing device 100 can observe the operating status of the system 30 and automatically detect an anomaly. For example, an SDR that does not belong to clusters generated in preliminary learning is generated in the operation diagnostic mode in some cases. This SDR belongs to a newly-generated cluster. The generation of the SDR belonging to the new cluster indicates deviation of the system 30 from the normal state thus far and involves a possibility of an abnormal state. Therefore, for example when a new cluster is generated, the observing device 100 determines that an anomaly has occurred, and displays that effect on the monitor 21. Visualizing the occurrence of an anomaly as above allows the administrator to easily recognize that there is a possibility that the system 30 has become an abnormal state.

Lines coupling the respective elements illustrated in FIG. 4 indicate part of communication paths and communication paths other than the communication paths illustrated in FIG. 4 can also be set. Furthermore, the functions of each element illustrated in FIG. 4 can be implemented by causing a computer to execute a program module corresponding to the element for example.

Next, the operation log that is collected from the system 30 and stored in the operation log storing unit 120 will be described.

Figure 5:
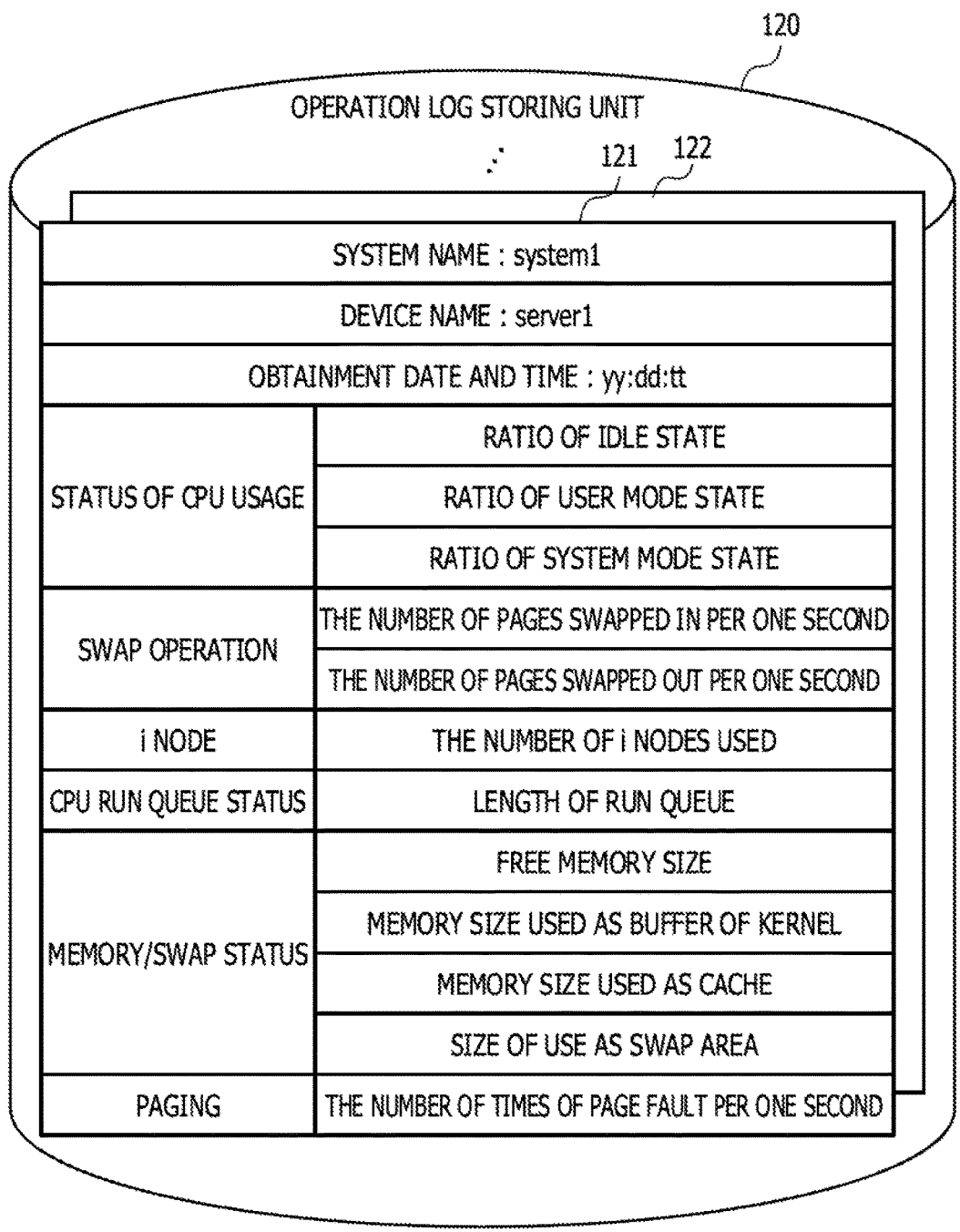
FIG. 5 is a diagram illustrating one example of an operation log stored in an operation log storing unit.

FIG. 5 is a diagram illustrating one example of the operation log stored in the operation log storing unit. Plural operation logs 121, 122, . . . are stored in the operation log storing unit 120.

For example, in the operation log 121, the system name of the system 30 to which the device that has outputted the operation log 121 belongs, the device name of the device, and the obtainment date and time of the operation log 121 are set. Moreover, in the operation log 121, information relating to performance items indicating the operating status in a unit period (for example, ten minutes) regarding the system 30 is included. As the performance items, there are items relating to the status of CPU usage, items relating to swap operation, items relating to the i node, items relating to the CPU run queue status, items relating to the memory/swap status, items relating to paging, and so forth. Each piece of information relating to the performance item is time transition of a numeric value relating to the performance item in the unit period for example.

As the performance items relating to the status of CPU usage, there are the ratio of the time for which the CPU was in the idle state due to waiting for the disk input/output (I/O), the ratio of the time for which the CPU was in the user mode state, the ratio of the time for which the CPU was in the system mode state, and so forth for example. As the performance items relating to swap operation, there are the number of pages swapped in per one second, the number of pages swapped out per one second, and so forth for example. As the performance items relating to the i node, there are the number of i nodes used and so forth for example. As the performance items relating to the CPU run queue status, there are the length of a queue of processes waiting for execution (waiting queue) (the number of processes) and so forth for example. As the performance items relating to the memory/swap status, there are the free memory size, the memory size used as the buffer by the kernel, the memory size used as a cache, the size of a storing area used as the swap area of the memory, and so forth for example. As the performance items relating to paging, there are the number of times of page fault caused per one second and so forth.

When plural devices exist in the system 30, the operation information is acquired from each device. For example, if plural servers exist in the system 30, the operation information collecting unit 110 acquires, from each server, the operation information including performance items such as the ratio of the time for which the CPU was in the idle state due to waiting for the disk I/O.

The operating status of the system 30 is analyzed on the basis of such operation logs 121, 122, . . . . The analysis of the operating status by the observing device 100 is first carried out in the preliminary learning mode. Then, the operation diagnostic mode is carried out after generation of a learning result by the preliminary learning mode.

First, analysis processing of the operating status in the preliminary learning mode will be described.

Figure 6:
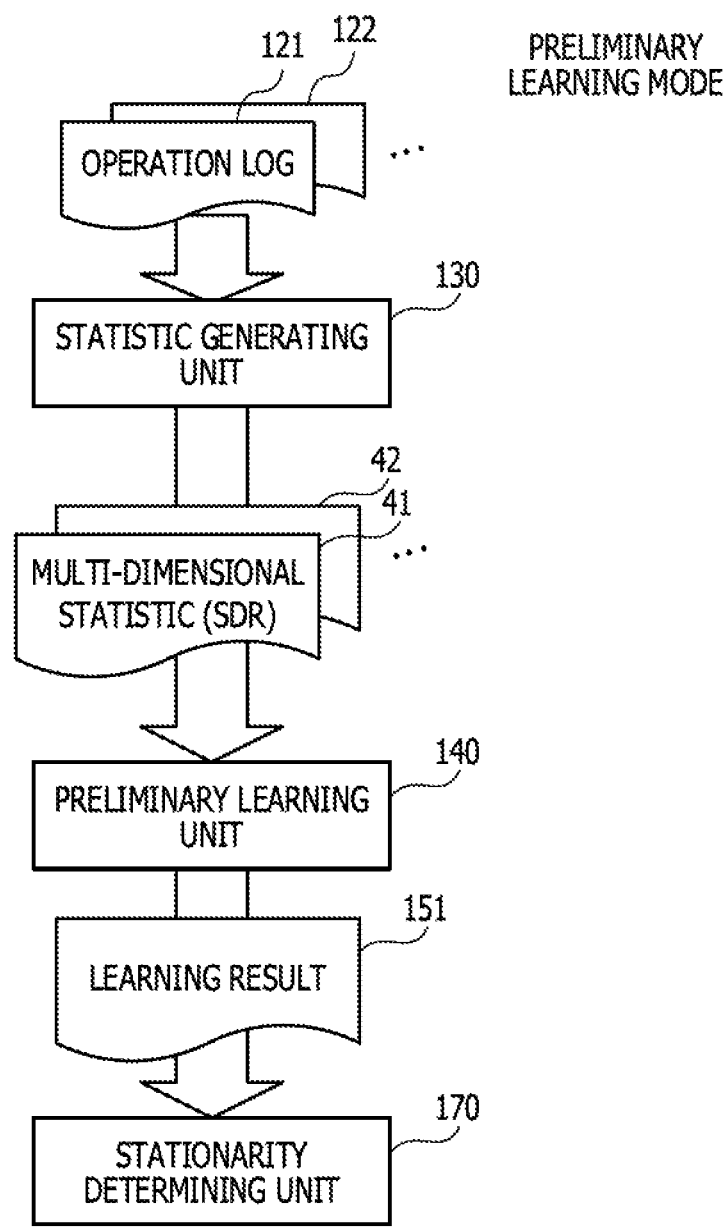
FIG. 6 is a diagram illustrating operating status analysis processing in a preliminary learning mode.

FIG. 6 is a diagram illustrating the operating status analysis processing in the preliminary learning mode. First, the statistic generating unit 130 executes statistic generation processing on the basis of the operation logs 121, 122, . . . and generates multi-dimensional statistics (SDR) 41, 42, . . . . One SDR is generated on the basis of the operation log in a specific unit period. If the number of performance items is N (N is an integer equal to or larger than 2), the SDR can be represented by a matrix of N rows and N columns (correlation matrix). Each element in the matrix represents whether or not the correlation between two performance items exists. It is also possible to line up the elements in the correlation matrix on one row and represent the SDR by a vector. The generated plural SDRs 41, 42, . . . each represent the operating status of the system 30 in the corresponding unit period.

On the basis of the generated plural SDRs 41, 42, . . . , preliminary learning relating to the tendency of generation of the operating status of the system 30 and the tendency of change in the operating status is carried out by the preliminary learning unit 140. Then, a learning result 151 is generated and stored in the learning result storing unit 150 by the preliminary learning unit 140. On the basis of the learning result 151, whether or not the stationarity exists is determined by the stationarity determining unit 170.

Each kind of processing represented in FIG. 6 will be described in detail below.

Figure 7:
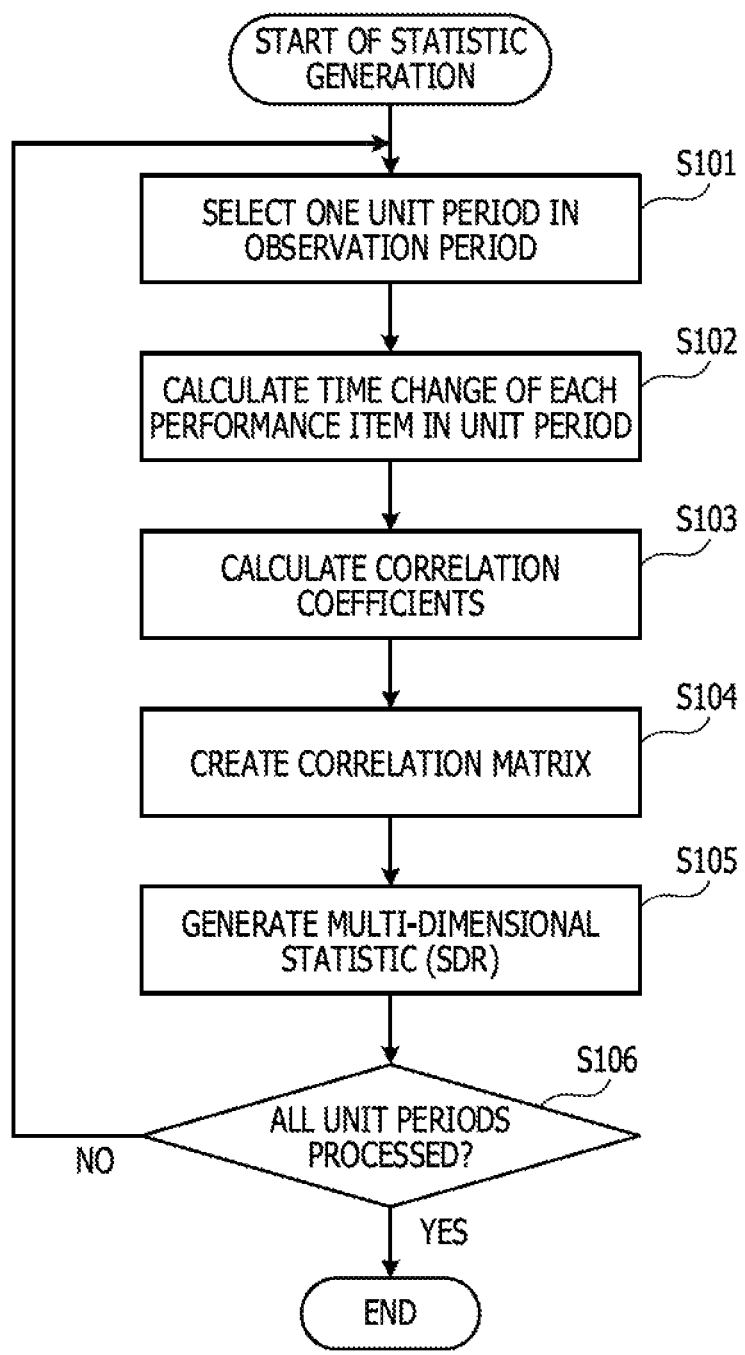
FIG. 7 is a flowchart illustrating one example of statistic generation processing.

FIG. 7 is a flowchart illustrating one example of statistic generation processing. The processing illustrated in FIG. 7 will be described below along the step numbers.

[Step S101] The statistic generating unit 130 selects one unit period that has not been processed among plural unit periods (for example, ten minutes) in an observation period (for example, a month).

[Step S102] The statistic generating unit 130 calculates time change of each performance item of the system 30 in the unit period on the basis of operation logs indicating the operation of the respective devices included in the system 30 in the unit period. For example, for each performance item, the statistic generating unit 130 takes the average at each time about numeric values (time-series data) indicated in the operation logs of the plural devices in the system 30 to calculate time change of the average.

[Step S103] The statistic generating unit 130 generates all of combinations obtained by selecting two performance items from the plural performance items and calculates a correlation coefficient for each combination of the performance items. If the number of performance items is N, the number of combinations of the performance items is "{N×(N−1)}/2." That is, "{N×(N−1)}/2" correlation coefficients are generated.

The correlation coefficient is a statistical index indicating the degree of the relevancy between two variables. The correlation coefficient is a real numeric value from "−1" to "1." A more positive correlation exists when the correlation coefficient is closer to "1," and a more negative correlation exists when the correlation coefficient is closer to "−1." The correlation is weaker when the correlation coefficient is closer to "0." The statistic generating unit 130 obtains the absolute value of each correlation coefficient obtained regarding a respective one of the combinations of the performance items. Then, the statistic generating unit 130 sets a value indicating the correlation (correlation value) to "1" if the absolute value is equal to or larger than a threshold, and sets the correlation value to "0" if the absolute value is smaller than the threshold. That is, even for a negative correlation, the correlation value is "1" as long as a correlation exists. By replacing the correlation coefficient by the correlation value of "1" or "0" in this manner, the amount of calculation in subsequent processing such as clustering can be reduced.

[Step S104] The statistic generating unit 130 generates a correlation matrix by disposing the correlation values obtained for each pair of the performance items as the elements of the matrix. When the number of performance items is defined as N, the correlation matrix has N rows and N columns. Each of the plural performance items is associated with row and column of the correlation matrix. In each element of the correlation matrix, the correlation value between the performance item corresponding to the row of the element and the performance item corresponding to the column is set. The correlation matrix obtained is a symmetric matrix.

[Step S105] The statistic generating unit 130 generates an SDR from the correlation matrix. For example, the statistic generating unit 130 lines up the respective elements of the correlation matrix on one row to transform the correlation matrix to a multi-dimensional vector. Because "{N×(N−1)}/2" correlation values exist, a "{N×(N−1)}/2"-dimensional vector is obtained when the SDR is represented by the multi-dimensional vector. The multi-dimensional vector obtained by the transformation serves as the SDR.

[Step S106] The statistic generating unit 130 determines whether or not processing has been executed regarding all unit periods. If the processing regarding all unit periods has been completed, the statistic generation processing ends. If a unit period that has not been processed exists, the processing is advanced to the step S101.

In this manner, the SDR of each unit period in the observation period is obtained.

Figure 8:
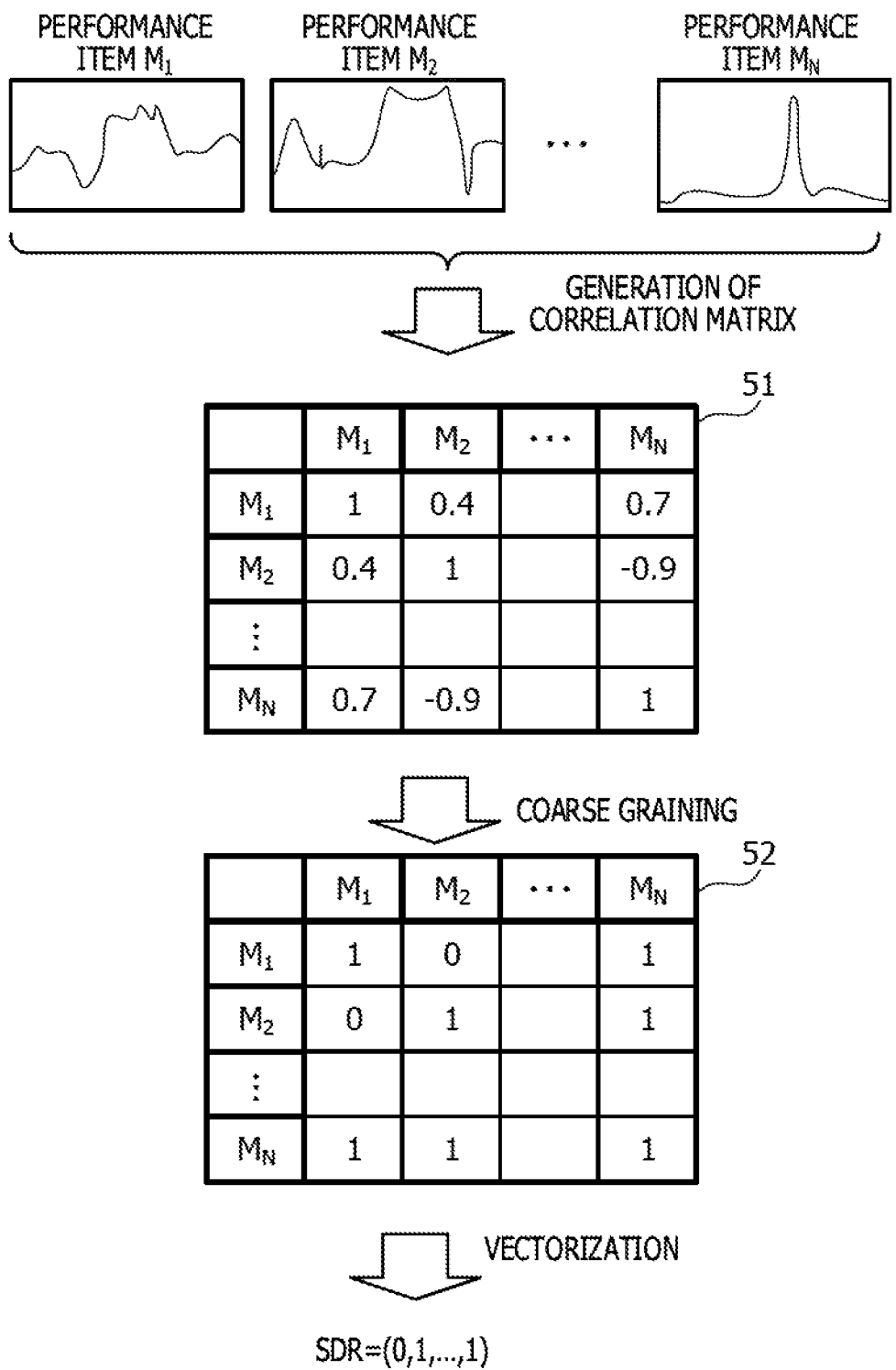
FIG. 8 is a diagram illustrating a generation example of a state description representations (SDR)

FIG. 8 is a diagram illustrating a generation example of an SDR. When N performance items exist, a correlation coefficient of each combination of two performance items is calculated and a correlation matrix 51 is generated. For example, the correlation coefficient of a performance item $M_1$ and a performance item $M_2$ is set as the element of the first row and the second column and the element of the second row and the first column in the correlation matrix 51.

The correlation coefficient of each element of the correlation matrix 51 is subjected to coarse graining due to whether or not the absolute value is equal to or larger than a given threshold. In the example of FIG. 8, the correlation value of "1" is set if the absolute value of the correlation coefficient is equal to or larger than "0.5" and the correlation value of "0" is set if the absolute value of the correlation coefficient is smaller than "0.5." Thereby, a correlation matrix 52 in which each element is digitized into "0" or "1" is generated.

Then, the respective elements in the correlation matrix 52 are lined up on one row and an SDR is generated. In the elements corresponding to the same combination of performance items, only one element is included in the SDR. For example, the statistic generating unit 130 lines up, on one row, the elements of the a-th row and the b-th column (a is an integer equal to or larger than 1 and b is an integer equal to or larger than a+1) in the correlation matrix 52 to generate the SDR.

Such an SDR is generated for each unit period in the observation period.

Next, the preliminary learning processing will be described in detail.

Figure 9:
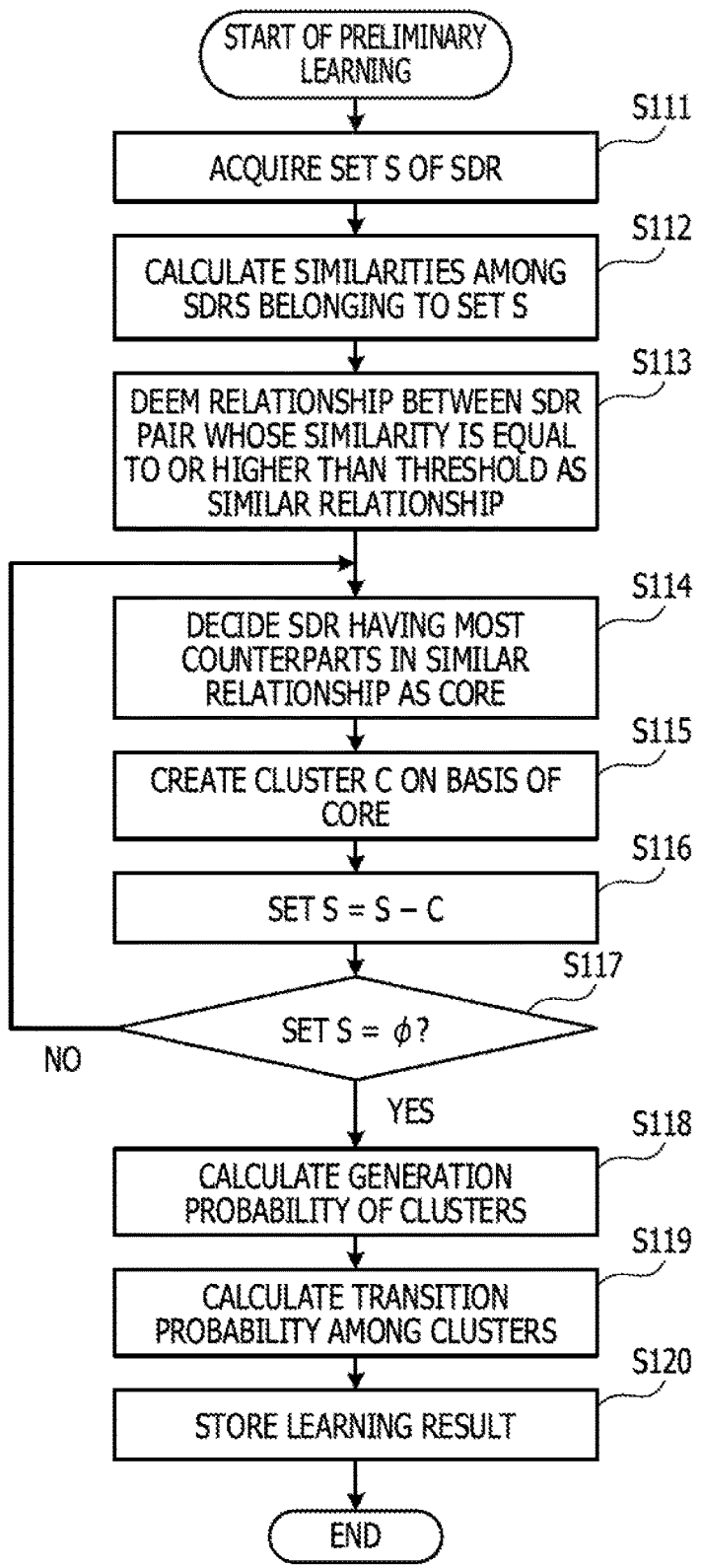
FIG. 9 is a flowchart illustrating one example of preliminary learning processing.

FIG. 9 is a flowchart illustrating one example of the preliminary learning processing. The processing illustrated in FIG. 9 will be described below along the step numbers.

[Step S111] When n (n is an integer equal to or larger than 1) SDRs exist, the preliminary learning unit 140 acquires a set $S=\{x_1, x_2, \ldots, x_n\}$ of the SDR from the statistic generating unit 130.

The preliminary learning unit 140 carries out clustering of the SDR by processing of a step S112 and the subsequent steps. As the clustering method, a k-means method, a hierarchical clustering method, a spectral clustering method, or the like can be used. In the second embodiment, a clustering method that allows generated clusters to properly represent the state of the system 30 is used. The clustering method applied to the second embodiment will be referred to as the "similarity clustering."

The procedure of the similarity clustering will be described below.

[Step S112] The preliminary learning unit 140 calculates the similarities among the SDRs belonging to the set S. As the similarity, the Jaccard index can be used for example. If the Jaccard index is employed as the similarity, with respect to any x, y∈S, the similarity J(x, y) is defined by the following expression.

$$J(x,y)=\text{Bit}(x \cap y)/\text{Bit}(x \cup y) \qquad (1)$$

The Bit( ) function is a function of counting the number of "1" of vectors. "x∩y" is the element-by-element logical product of the vector of the SDR of x and the vector of the SDR of y. For example, when x=(1, 0, 0, 1) and y=(0, 1, 0, 1) are satisfied, "x∩y=(0, 0, 0, 1)" is obtained. "x∪y" is the element-by-element logical sum of the vector of the SDR of x and the vector of the SDR of y. For example, when x=(1, 0, 0, 1) and y=(0, 1, 0, 1) are satisfied, "x∪y=(1, 1, 0, 1)" is obtained. A larger value of the similarity indicates that the compared two SDRs (SDR pair) are more similar.

[Step S113] The preliminary learning unit 140 deems the relationship between the SDR pair whose similarity is equal to or higher than a given threshold th as the similar relationship. That is, the preliminary learning unit 140 determines that the similar relationship exists regarding the SDR pair satisfying the following expression.

$$x,y \in S, x \sim y \Leftrightarrow J(x,y) \geq th \qquad (2)$$

[Step S114] The preliminary learning unit 140 decides the SDR having the most counterparts in the similar relationship as a core $S_{1*}$ among the SDRs belonging to the set S.

[Step S115] The preliminary learning unit 140 decides a cluster C on the basis of the core $S_{1*}$. For example, the preliminary learning unit 140 generates an ordered similar set $\text{Sim}(S_{1*})$ on the basis of the core $S_{1*}$. The similar set $\text{Sim}(S_{1*})$ is defined as follows.

$$\text{Sim}(S_{1*})=\{\forall S_i \in S | J(S_{1*}, S_i) \geq th\} \qquad (3)$$

The order of the elements in the similar set $\text{Sim}(S_{1*})$ is the decreasing order of the similarity. That is, the beginning of the elements of the similar set $\text{Sim}(S_{1*})$ is the core S. If the number of elements included in the similar set $\text{Sim}(S_{1*})$ is m (m is an integer equal to or larger than 1), the similar set $\text{Sim}(S_{1*})$ can be represented as follows.

$$\text{Sim}(S_{1*})=\{s_1=S_{1*}, s_2, \ldots, s_m\} \qquad (4)$$

The preliminary learning unit 140 generates the cluster C due to a set of SDRs having the similar relationship with each other among the SDRs included in the similar set $\text{Sim}(S_{1*})$. When the number of SDRs having the similar relationship with each other is k (k is an integer equal to or larger than 1), the cluster C is represented by the following expression.

$$C=\{s_1, s_2, \ldots, s_k\} \qquad (5)$$

Here, when arbitrary two SDRs in the cluster C are defined as $s_i$ and $s_j$, the similarity $J(s_i, s_j) \geq th$ is established.

In the second embodiment, the number of SDRs belonging to the generated cluster is permitted to be "1." That is, if another SDR in the similar relationship with the core $S_{1*}$ does not exist in the set S, a cluster including only the core $S_{1*}$ as the element is generated.

The preliminary learning unit 140 gives a cluster ID to the generated cluster C and stores the cluster C in the memory 102. For example, the preliminary learning unit 140 sets the cluster ID of the cluster C generated first to "1" and thereafter sets the cluster ID of the generated cluster to 2, 3, . . . every time the cluster is generated.

[Step S116] The preliminary learning unit 140 excludes the SDRs belonging to the cluster C created in the step S115 from the set S (set S=S−C).

[Step S117] The preliminary learning unit 140 determines whether or not the set S has become the empty set. If the set S is the empty set, the processing is advanced to a step S118. If at least one SDR is included in the set S, the processing is advanced to the step S114.

[Step S118] The preliminary learning unit 140 calculates the generation probability of the SDRs belonging to the generated respective clusters for each of time zones obtained by dividing the period as the basis into plural periods. For example, suppose that the period as the basis is set to one day (24 hours), and K (K is an integer equal to or larger than 1) SDRs are generated on the basis of operation logs of one day. At this time, the obtainment times of the K operation logs of one day are defined as $T_1, T_2, \ldots T_K$ in the increasing order of the time of the operation log.

The preliminary learning unit 140 makes a comparison among the SDRs corresponding to the time $T_1$ of the respective days in the observation period and calculates the generation probability of the clusters to which the SDRs appearing at the time $T_1$ belong. The preliminary learning unit 140 calculates the generation probability of the clusters regarding each of the times $T_2, \ldots T_K$ similarly. This allows understanding of what cluster state the system 30 readily becomes in a specific time zone in one day.

[Step S119] The preliminary learning unit 140 generates a transition probability matrix among the clusters. The transition probability matrix is a matrix indicating the probability of transition of the SDR indicating the state of the system 30 from a certain cluster to another cluster.

For example, the preliminary learning unit 140 lines up the cluster IDs of the clusters to which SDRs belong in a time-series manner on the basis of the obtainment time of the operation logs as the generation sources of the SDRs. Next, the preliminary learning unit 140 extracts pairs of adjacent cluster IDs, and deems the former cluster ID in the time series as the transition source and deems the latter cluster ID in the time series as the transition destination. The preliminary learning unit 140 counts the numbers of times of generation of pairs of cluster IDs indicating the transition source and the transition destination. Then, the preliminary learning unit 140 deems the ratio of the number of times of generation of a respective one of transition destinations to the total number of times of generation of the same transition source as the transition probability of the transition indicated by the pair of cluster IDs. The preliminary learning unit 140 disposes the transition probabilities corresponding to the respective pairs of cluster IDs as the elements of a matrix to generate the transition probability matrix.

[Step S120] The preliminary learning unit 140 stores the learning result 151 in the learning result storing unit 150. In the learning result 151, information indicating the generation probability, the transition probability matrix, and information relating to the sets of SDRs belonging to the respective clusters are included.

In this manner, the generation probability and the transition probability matrix are generated.

Figure 10:
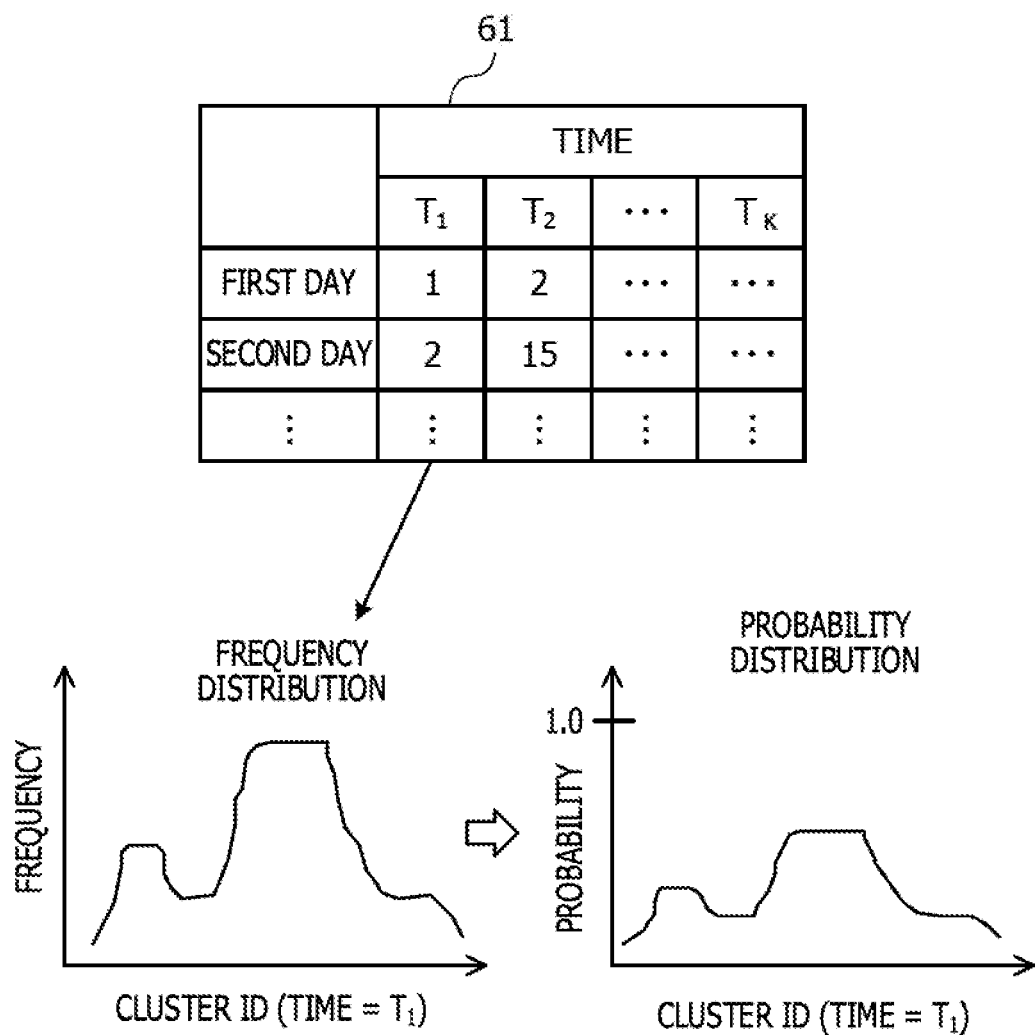
FIG. 10 is a diagram illustrating a calculation example of generation probability.

FIG. 10 is a diagram illustrating a calculation example of the generation probability. For example, the preliminary learning unit 140 sets the cluster ID indicating the state of the system 30 in each time zone in one day in a cluster ID management table 61. In the cluster ID management table 61, in association with the times at which time zones obtained by dividing one day into K time zones end, the cluster IDs indicating the state of the system 30 in the relevant time zone in each day are set. The preliminary learning unit 140 extracts the cluster IDs set at the time $T_1$ in the respective days in the observation period and counts the appearance frequency (the number of times of appearance) of each cluster ID. Thereby, the frequency distribution of the cluster ID at the time $T_1$ is obtained.

When the frequency of each cluster ID is divided by the total number of cluster IDs set at the time $T_1$, the generation probability of each cluster ID is obtained. For example, if the observation period is 30 days, the generation probability is obtained by dividing the frequency of each cluster ID by 30. As a result, the probability distribution of the cluster ID at the time $T_1$ is obtained. The preliminary learning unit 140 also calculates the probability distributions at the other times $T_2, \ldots T_K$ similarly.

Figure 11:
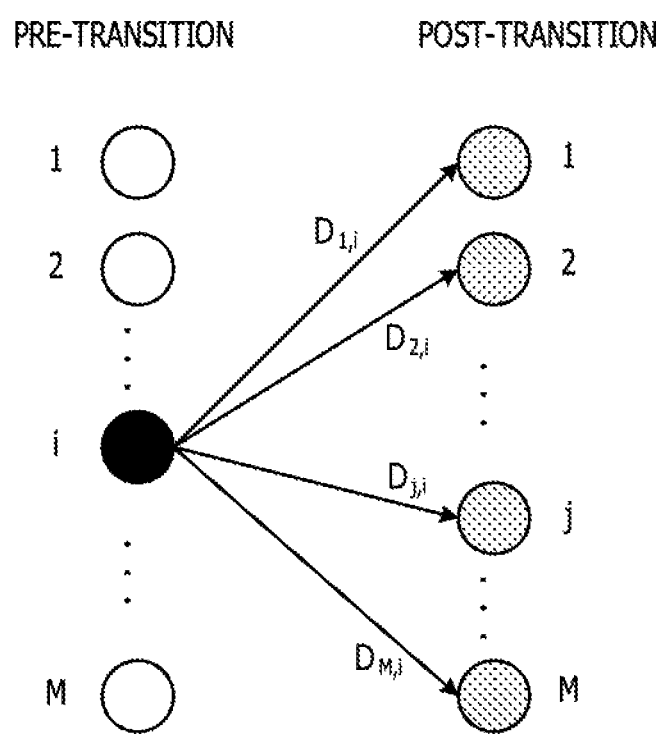
FIG. 11 is a diagram illustrating a calculation example of transition probability.

FIG. 11 is a diagram illustrating a calculation example of the transition probability. For example, the preliminary learning unit 140 identifies the dates and times at which the cluster ID is "i" (what times on what days) from the cluster ID management table 61. The preliminary learning unit 140 extracts all of the cluster IDs at the times subsequent to the relevant dates and times. The preliminary learning unit 140 calculates the generation probability regarding each of the extracted cluster IDs. If the total number of clusters is M (M is an integer equal to or larger than 1), the transition probabilities "$D_{1,i}, D_{2,i}, \ldots, D_{j,i}, \ldots, D_{M,i}$" from the cluster of the cluster ID "i" to a respective one of all cluster IDs "1, 2, \ldots, j, \ldots, M" are calculated.

Such calculation of transition probabilities are performed regarding the cases in each of which a respective one of all cluster IDs is employed as the pre-transition cluster ID. As a result, the transition probabilities are calculated regarding all combinations of the pre-transition and post-transition cluster IDs. Then, the transition probability matrix is generated by employing the calculated transition probabilities as elements of the matrix.

The learning result 151 is generated by the above-described preliminary learning.

FIG. 12 is a diagram illustrating one example of the learning result. In the learning result 151, generation probability information 151a, a transition probability matrix 151b, and cluster information 151c are included for example. In the generation probability information 151a, regarding each time, the generation probability of each cluster ID at the relevant time is set.

In the transition probability matrix 151b, the cluster IDs of clusters of the transition source are associated with the columns and the cluster IDs of clusters of the transition destination are associated with the rows. As the element at the position of the intersection of a column and a row in the transition probability matrix 151b, the transition probability in the case in which the cluster ID of this column is the transition source and the cluster ID of this row is the transition destination is set.

In the cluster information 151c, in association with the cluster ID, the sets of the SDRs belonging to the cluster indicated by the cluster ID are set. In each SDR, the date and time when the system 30 becomes the state indicated by the SDR is set.

On the basis of such a learning result, statistical properties are determined. The statistical properties are whether or not the stationarity of the generation probability and the transition probability exists. The stationarity means that the probability distribution does not change even when the period differs.

Figure 13:
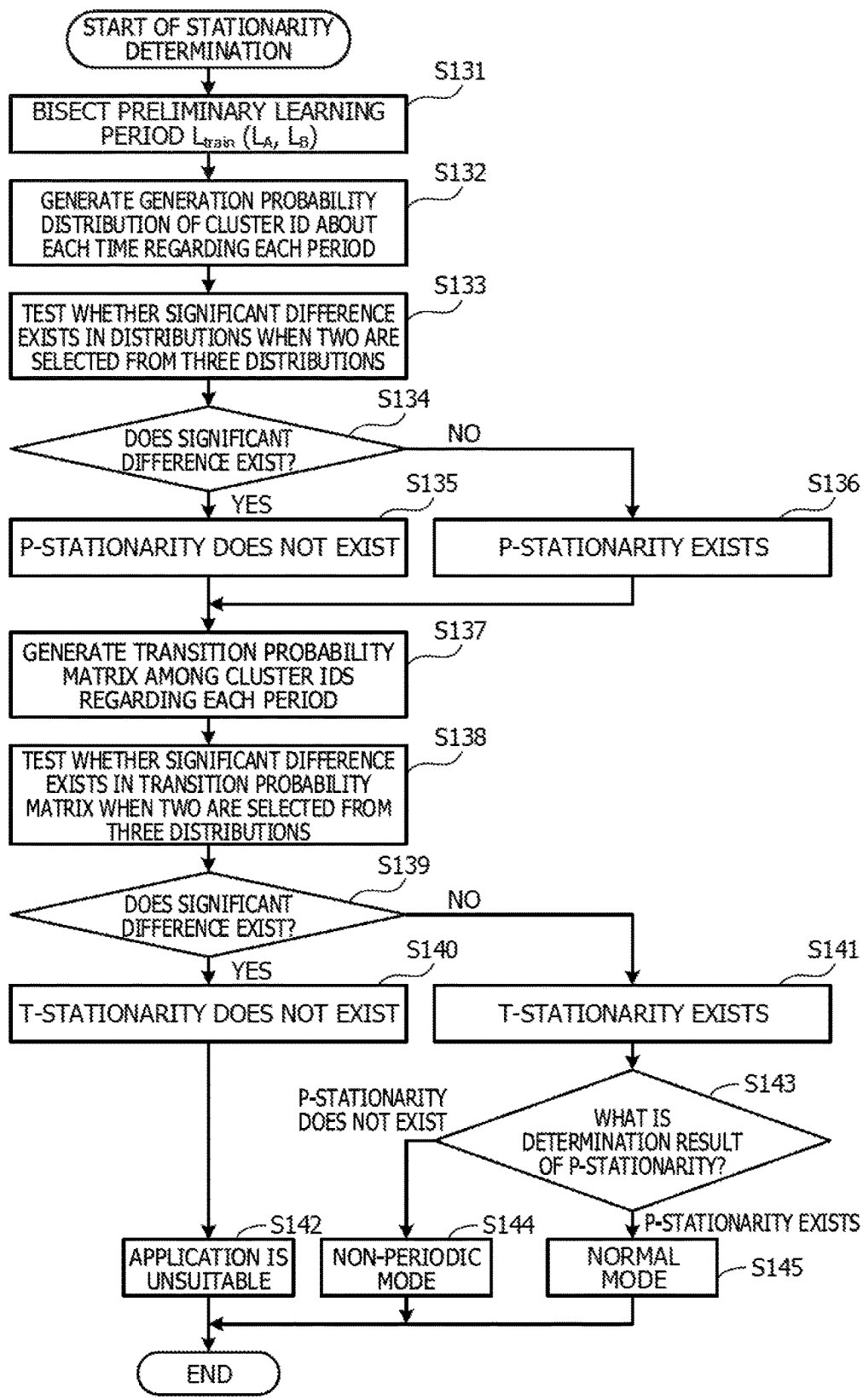
FIG. 13 is a flowchart illustrating a procedure of stationarity determination processing.

FIG. 13 is a flowchart illustrating a procedure of stationarity determination processing. The processing illustrated in FIG. 13 will be described below along the step numbers.

[Step S131] The stationarity determining unit 170 bisects a preliminary learning period $L_{train}$. The stationarity determining unit 170 deems the divided periods obtained by the bisection as $L_A$ and $L_B$.

[Step S132] On the basis of the generation probability information 151a, the stationarity determining unit 170 generates the generation probability distribution of the cluster ID regarding each of the preliminary learning period $L_{train}$ and the divided periods $L_A$ and $L_B$.

[Step S133] The stationarity determining unit 170 generates pairs of two periods from the three periods (three pairs) and tests whether or not a significant difference exists between the generation probability distributions of the two periods in the pair. As the test method, the goodness of fit test (x-square test), the Kolmogorov-Smirnov test, or the like can be used. In the case of using the goodness of fit test, a statistic "$\chi$-square" is calculated, with one of the compared two generation probability distributions employed as the expected value and the other employed as the observed value. If the value of the $\chi$-square is equal to or larger than a given value, it can be determined that a significant difference exists.

[Step S134] The stationarity determining unit 170 determines whether or not a significant difference exists among the three periods. For example, the stationarity determining unit 170 determines that a significant difference exists if a significant difference is recognized in the generation probability distributions in at least one pair among the three pairs of periods. If a significant difference exists, the processing is advanced to a step S135. If a significant difference does not exist, the processing is advanced to a step S136.

[Step S135] The stationarity determining unit 170 determines that the stationarity of the generation probability distribution (P-stationarity) does not exist, and moves the processing to a step S137.

[Step S136] The stationarity determining unit 170 determines that the P-stationarity exists.

[Step S137] The stationarity determining unit 170 generates a transition probability matrix among the cluster IDs regarding each of the three periods.

[Step S138] The stationarity determining unit 170 generates pairs of two periods from the three periods (three pairs) and tests whether or not a significant difference exists between the transition probability matrices of the two periods in the pair.

[Step S139] The stationarity determining unit 170 determines whether or not a significant difference exists among the three periods. For example, the stationarity determining unit 170 determines that a significant difference exists if a significant difference is recognized in the transition probability matrices in at least one pair among the three pairs of periods. If a significant difference exists, the processing is advanced to a step S140. If a significant difference does not exist, the processing is advanced to a step S141.

[Step S140] The stationarity determining unit 170 determines that the stationarity of the transition probability matrix (T-stationarity) does not exist. Thereafter, the processing is advanced to a step S142.

[Step S141] The stationarity determining unit 170 determines that the T-stationarity exists. Thereafter, the processing is advanced to a step S143.

[Step S142] If the T-stationarity does not exist, the stationarity determining unit 170 determines that the state of the system 30 is unsuitable for application of anomaly determination processing, and ends the processing.

[Step S143] If the T-stationarity exists, the stationarity determining unit 170 causes the processing to branch depending on the determination result of the P-stationarity. If the P-stationarity does not exist, the processing is advanced to a step S144. If the P-stationarity exists, the processing is advanced to a step S145.

[Step S144] If the P-stationarity does not exist although the T-stationarity exists, the stationarity determining unit 170 sets the operation mode of the anomaly determination to a "non-periodic mode" and ends the processing.

[Step S145] If both the T-stationarity and the P-stationarity exist, the stationarity determining unit 170 sets the operation mode of the anomaly determination to a "normal mode" and ends the processing.

The determination of the stationarity allows understanding of the presence or absence of the P-stationarity and the T-stationarity. Due to the presence or absence of the P-stationarity and the T-stationarity, the statistical reliability of the learning result can be determined. For example, the statistical reliability of the generation probability information 151a is high if the P-stationarity exists. In this case, a deviation from the stationarity about the generation probability of the cluster to which SDRs indicating the subsequent state of the system 30 belong can be detected by using the generation probability information 151a. Furthermore, the statistical reliability of the transition probability matrix 151b is high if the T-stationarity exists. In this case, a deviation from the stationarity about the transition probability of the cluster to which SDRs indicating the subsequent state of the system 30 belong can be detected by using the transition probability matrix 151b.

The deviation from the stationarity after learning can be detected by causing the observing device 100 to operate in the operation diagnostic mode. The processing of the observing device 100 in the operation diagnostic mode will be described in detail below.

Figure 14:
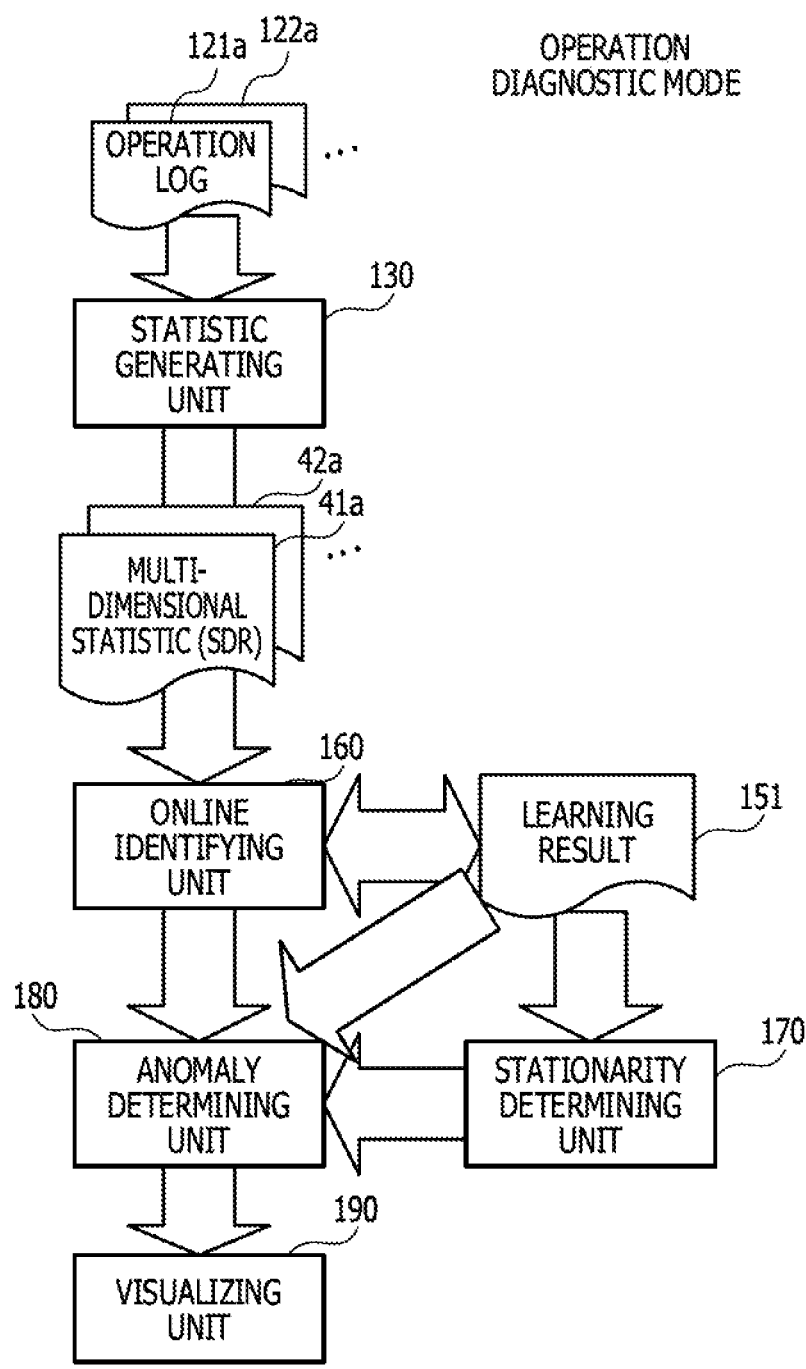
FIG. 14 is a diagram illustrating operating status analysis processing in an operation diagnostic mode.

FIG. 14 is a diagram illustrating operating status analysis processing in the operation diagnostic mode. In the operation diagnostic mode, operation logs 121a, 122a, . . . are collected from the system 30 by the real-time system. Furthermore, SDRs 41a, 42a, . . . are generated by the statistic generating unit 130 every time the operation logs 121a, 122a, . . . are acquired.

The online identifying unit 160 executes online identification processing on the basis of the learning result 151 obtained by preliminary learning. In the online identification processing, dynamic similarity clustering is carried out for new SDRs under operation monitoring. In the dynamic similarity clustering, the cluster to which an SDR belongs is determined every time the SDR is generated. In an online learning mode, the learning result 151 is updated on the basis of the result of the determined clustering.

Thereafter, similarly to the preliminary learning mode, stationarity determination by the stationarity determining unit 170 is carried out. At this time, the stationarity determining unit 170 transmits, to the anomaly determining unit 180, the determination result of the stationarity determined in the preliminary learning mode and the determination result of the stationarity determined in the operation diagnostic mode.

The anomaly determining unit 180 determines whether or not the occurrence of an anomaly is present on the basis of the learning result 151, the identification result by the online identifying unit 160, and the stationarity determination result by the stationarity determining unit 170. Then, information indicating the occurrence status of the anomaly and so forth is visualized by the visualizing unit 190.

Next, the online identification processing will be described in detail.

Figure 15:
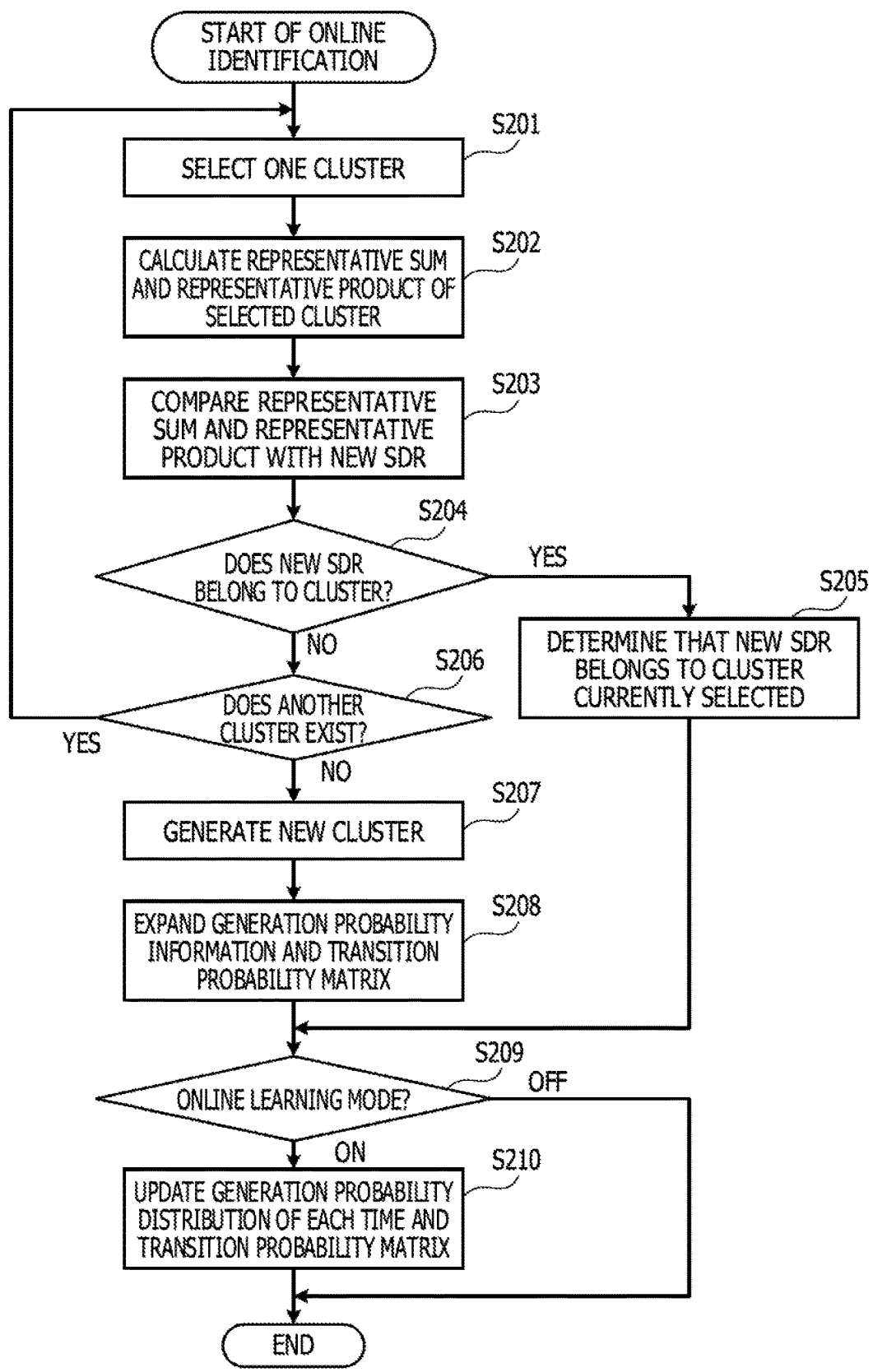
FIG. 15 is a flowchart illustrating one example of online identification processing.

FIG. 15 is a flowchart illustrating one example of the online identification processing. The processing illustrated in FIG. 15 will be described below along the step numbers.

[Step S201] The online identifying unit 160 selects one cluster.

[Step S202] The online identifying unit 160 calculates the representative sum and the representative product of the selected cluster.

For example, suppose that the following clusters are obtained by preliminary learning.

$$C_{train} = \{C_1, C_2, \ldots, C_n\} \quad (6)$$

A representative sum $S_{i:+}$ and a representative product $S_{i:x}$ about each cluster $\forall C_i$ are defined as follows.

$$\forall C_i \in C_{train}, \forall S_k \in C_i, S_{i:+} = \cup_k S_k, S_{i:x} = \cap_k S_k \quad (7)$$

The representative sum is the logical sum of the bit value of each element of the SDRs in the cluster. That is, the representative sum is a vector in which "1" is set for the element that is "1" in any one SDR and "0" is set for the element that is "0" in all SDRs. The representative product is the logical product of the bit value of each element of the SDRs in the cluster. That is, the representative product is a vector in which "1" is set for the element that is "1" in all SDRs in the cluster and "0" is set for the element that is "0" in any one SDR.

[Step S203] The online identifying unit 160 compares each of the representative sum and the representative product with an SDR newly generated. For example, the online identifying unit 160 deems the newly-input SDR as $S_X$. At this time, the online identifying unit 160 carries out, for $S_X$, determination of whether $S_X$ belongs to any of $C_1$, $C_2, \ldots, C_n$ at high speed due to the following calculation by using the representative sum and the representative product.

$$S_X \in C_i \Leftrightarrow \exists C_i \in C_{train}, (S_X \subset S_{i:+}) \& (S_X \supset S_{i:X}) \quad (8)$$

In expression (8), "$S_X \subset S_{i:+}$" indicates that the element that is "1" in the vector of the new SDR is "1" also in the representative sum of the cluster $C_i$. "$S_X \supset S_{i:X}$" indicates that the element that is "1" in the representative product of the cluster $C_i$ is "1" also in the vector of the new SDR. If the new SDR satisfies both "$S_X \subset S_{i:+}$" and "$S_X \supset S_{i:X}$," it can be determined that the SDR belongs to the cluster $C_i$. Due to such a calculation, which cluster the new SDR belongs to can be determined by merely carrying out the comparison of the bit vector twice.

Even when the new SDR ($S_X$) does not satisfy the relationship of expression (8) with the cluster $C_i$, possibly the similarity $J(s_i, s_j) \geq th$ is established between SDR ($S_X$) and all SDRs belonging to the cluster $C_i$ depending on the case. Therefore, if the cluster to which the new SDR belongs is not found in the determination based on expression (8), the online identifying unit 160 determines the cluster to which the new SDR belongs by the following expression for example.

$$J((S_{i:+} \cup S_X), (S_{i:X} \cap S_X)) \geq th \quad (9)$$

If the cluster $C_i$ satisfying expression (9) although not satisfying expression (8) exists with respect to the new SDR, it can be determined that the new SDR belongs to the cluster $C_i$.

[Step S204] The online identifying unit 160 determines whether or not the new SDR belongs to the selected cluster. If the new SDR belongs to the selected cluster, the processing is advanced to a step S205. If the new SDR does not belong to the selected cluster, the processing is advanced to a step S206.

[Step S205] The online identifying unit 160 determines that the new SDR belongs to the cluster currently selected, and gives the cluster ID of the cluster currently selected to the SDR. Thereafter, the processing is advanced to a step S209.

[Step S206] The online identifying unit 160 determines whether or not a cluster that has not been selected exists. If a cluster that has not been selected exists, the processing is advanced to the step S201. If all clusters have been selected, the processing is advanced to a step S207.

[Step S207] If the new SDR belongs to none of the existing clusters, the online identifying unit 160 generates the new cluster represented below.

$$C_{n+1} = \{S_X\} \quad (10)$$

[Step S208] The online identifying unit 160 expands the generation probability information 151a (see FIG. 12) and the transition probability matrix 151b (see FIG. 12) on the basis of the newly-generated cluster. For example, the online identifying unit 150 increases the field of the cluster ID by one for the generation probability information 151a. Furthermore, the online identifying unit 160 adds one column of the transition source cluster ID and adds one row of the transition destination cluster ID for the transition probability matrix 151b.

[Step S209] The online identifying unit 160 determines whether or not the current mode is the online learning mode. If the current mode is the online learning mode, the processing is advanced to a step S210. If the current mode is not the online learning mode, the processing ends.

[Step S210] The online identifying unit 160 updates the generation probability distribution of each time in the generation probability information 151a and the values of elements in the transition probability matrix 151b. Thereafter, the processing ends.

Due to such online identification, every time an SDR is generated, clustering including the SDR can be carried out.

Next, the anomaly determination processing will be described in detail. In the second embodiment, whether or not "state anomaly," "time-series anomaly," and "stationarity anomaly" exist is determined as the anomaly determination.

The "state anomaly" is an anomaly indicating that a cluster is newly generated (new state occurs) or an SDR belonging to a cluster in which the generation probability is low is generated (rare state occurs). The state anomaly can be determined on the basis of the generation probability information 151a and the identification result by the online identifying unit 150.

FIG. 16 is a diagram illustrating a first example of the state anomaly. For example, suppose that plural clusters 71 to 73 have been generated in preliminary learning. In FIG. 16, dots in the clusters 71 to 73 represent SDRs belonging to the respective clusters.

Thereafter, by online identification in the operation diagnostic mode, first it is determined whether or not an SDR newly generated belongs to any of the existing clusters 71 to 73. If the new SDR belongs to none of the clusters, a new cluster 74 is generated and it is determined that the new SDR belongs to the cluster 74.

If the new cluster 74 is generated as above, the anomaly determining unit 180 determines that a state anomaly has occurred.

Furthermore, even if the new SDR belongs to the existing cluster, the anomaly determining unit 180 determines that a state anomaly has occurred if the generation probability of the cluster ID about the cluster to which the SDR belongs is equal to or lower than a given threshold at the obtainment time of the operation log as the generation source of the SDR.

Figure 17:
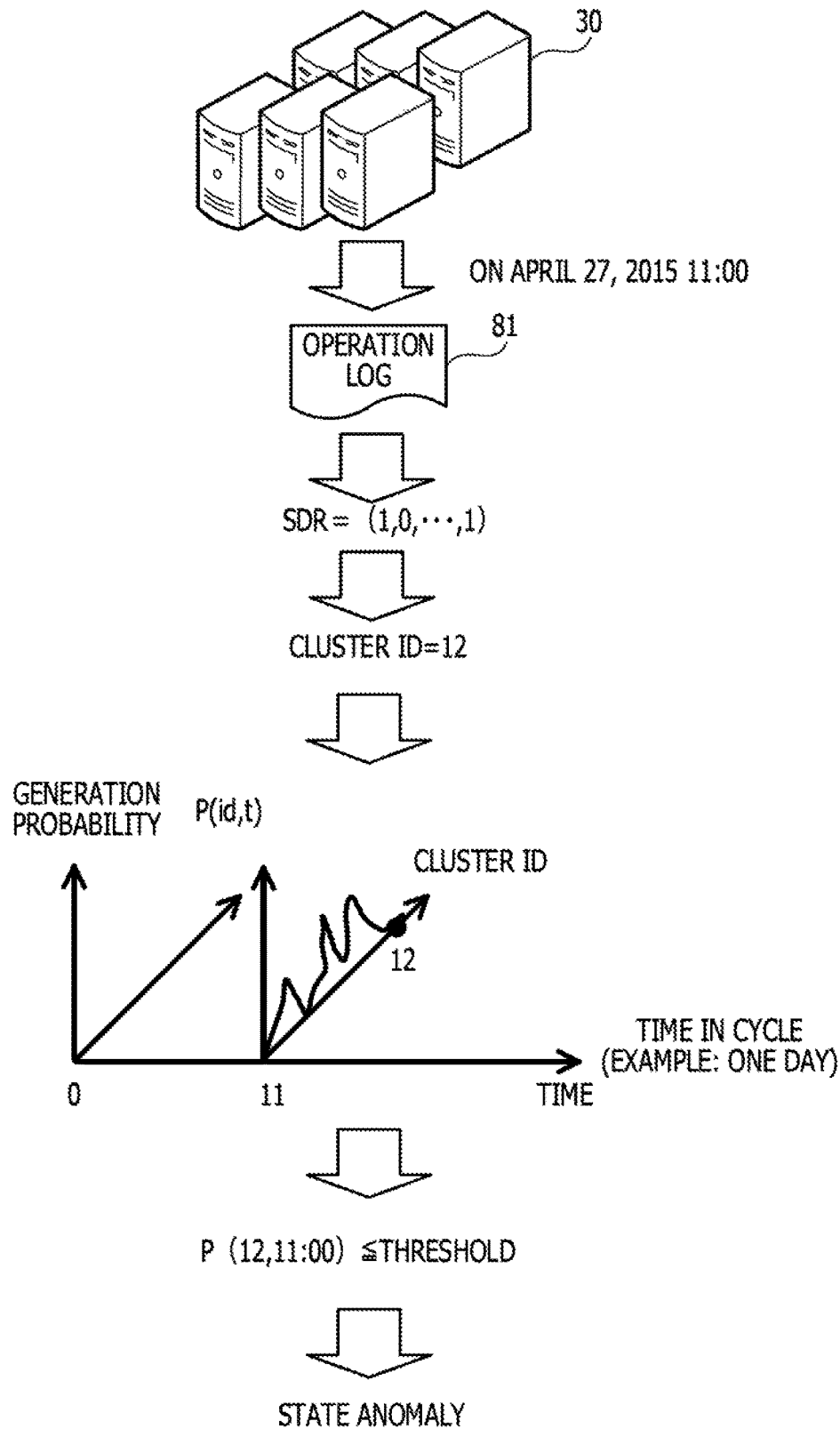
FIG. 17 is a diagram illustrating a second example of a state anomaly.

FIG. 17 is a diagram illustrating a second example of the state anomaly. For example, suppose that an operation log 81 is obtained at 11:00 on Apr. 27, 2015, in the operation diagnostic mode. This operation log 81 is time-series data about the values of the respective performance items in the time zone from 10:50 to 11:00 on the same day. On the basis of this operation log 81, an SDR indicating the state of the system 30 at the time of the obtainment of the operation log 81 is generated. Suppose that it is determined that this SDR belongs to an existing cluster with a cluster ID "12" as a result of discrimination of the cluster to which this SDR belongs by online identification.

In this case, the anomaly determining unit 180 refers to the generation probability information 151a and acquires generation probability P(12, 11:00) of the cluster ID "12" at the time "11:00." If the value of the generation probability is equal to or smaller than a given threshold, the anomaly determining unit 180 determines that a state anomaly has occurred.

In order to carry out the determination of the state anomaly like those illustrated in FIG. 16 and FIG. 17, the anomaly determining unit 180 calculates a state anomaly score. The state anomaly score is represented by the following expression.

$$Ase(id) = N(F(\text{Eval}(P(id, t)))) \quad (11)$$

In expression (11), P(id, t) is the generation probability of the cluster ID indicated by "id" at time t. Eval(x) is a probability evaluation function. F(x) is a filter function and is a function that carries out transformation such as highlighting the result of the Eval function. N(x) is a normalization function and acts to cause the value of the anomaly to fall within a range of 0 to 1.

A concrete example of calculation expressions of the state anomaly score will be represented below.

State Anomaly Score (First Example)

If $P(id,t)=0, Ase(id)=1$ (12)

If $P(id,t) \neq 0, \text{Eval}(x)=1/P(id,t)$ (13)

$F(x)=\text{if}(x>10)$ then 1 else 0 (14)

$N(x)=x$ (15)

Expression (12) corresponds to the case in which, regarding the cluster to which a new SDR belongs, the generation probability corresponding to the cluster ID of the cluster before online identification of the SDR is "0." In this case, the occurrence of a state anomaly is represented by setting the state anomaly score to the maximum value of "1."

Expression (13) is an expression that causes the value of the probability evaluation function to be larger when the generation probability is lower. Furthermore, in expression (14), the value of the filter function is set to "1" if the value of the probability evaluation function is larger than a threshold of "10" and otherwise the value of the filter function is set to "0." In this example, the value of the filter function is "1" or "0" and already falls within the range of 0 to 1. Therefore, no operation is carried out in the normalization function of expression (15), so that the value of the filter function is output as it is.

State Anomaly Score (Second Example)

If $P(id,t)=0, Ase(id)=1$ (16)

If $P(id,t) \neq 0, \text{Eval}(x)=1/P(id,t)$ (17)

$F(x)=\ln(x)$ (18)

$N(x)=x$ (19)

Expressions (16), (17), and (19) in the second example are the same as expressions (12), (13), and (15), respectively, in the first example. ln(x) of expression (18) represents the natural logarithm.

State Anomaly Score (Third Example)

If $P(id,t)=0, Ase(id)=1$ (20)

If $P(id,t) \neq 0, \text{Eval}(x)=\text{Rank}(P(id,t))$ (21)

$F(x)=x$ (22)

$N(x)=x/ID_{max}$ (23)

Expression (20) in the third example is the same as expression (12) in the first example. Rank(x) in expression (21) is the rank of the generation probability of the cluster ID "id" when the generation probabilities of the respective cluster IDs that exist are sorted in decreasing order of the value. For example, suppose that, regarding cluster IDs=1 to 3, the generation probabilities are P(1, t)=0.1, P(2, t)=0.7, and P(3, t)=0.2. At this time, Rank(P(1, t))=3, Rank(P(2, t))=1, and Rank(P(3, t))=2 are obtained. No operation is carried out in the filter function represented in expression (22) and an input value is output as it is. "$ID_{max}$" of expression (23) is the maximum value of the cluster ID. If the cluster IDs=1 to 3, $ID_{max}$=3 and N(x)=x/3 are satisfied. If the cluster ID of the cluster to which an SDR newly generated belongs is "1" (P(1, t)=0.1, Rank (P(1, t))=3), the state anomaly score is as follows.

$Ase(1)=\text{Rank}(P(1,t))/ID_{max}=3/3=1$ (24)

The state anomaly score can be calculated by any of the above-described calculation expressions. Furthermore, it is determined that a state anomaly has occurred if the state anomaly score is equal to or larger than a given value.

Next, the time-series anomaly will be described in detail. The time-series anomaly can be determined on the basis of the transition probability matrix 151b.

For example, suppose that the occurrence frequencies of the SDRs belonging to the respective clusters at time t0−1 have been obtained. At this time, the occurrence frequencies of the SDRs belonging to the respective clusters at time t0 are represented by the following expression.

$$\begin{pmatrix} \Phi_{t_0}(S_1) \\ \Phi_{t_0}(S_2) \\ \ldots \\ \Phi_{t_0}(S_i) \\ \ldots \\ \Phi_{t_0}(S_M) \end{pmatrix} = \begin{pmatrix} D_{1,1} & \ldots & D_{1,i} & \ldots & D_{1,M} \\ D_{2,1} & \ldots & \ldots & \ldots & D_{2,M} \\ \ldots & \ldots & \ldots & \ldots & \ldots \\ D_{j,1} & \ldots & D_{j,i} & \ldots & \ldots \\ \ldots & \ldots & \ldots & \ldots & \ldots \\ D_{M,1} & \ldots & \ldots & \ldots & D_{M,M} \end{pmatrix} \begin{pmatrix} \Phi_{t_0-1}(S_1) \\ \Phi_{t_0-1}(S_2) \\ \ldots \\ \Phi_{t_0-1}(S_i) \\ \ldots \\ \Phi_{t_0-1}(S_M) \end{pmatrix}$$ (25)

Here, $\Phi_{t0-1}(S_i)$ is the generation probability of the SDR belonging to the cluster whose cluster ID is "i" (i=1, 2, ..., M) at the time t0−1. $\Phi_{t0}(S_i)$ is the generation probability of the SDR belonging to the cluster whose cluster ID is "i" at the time to.

Expression (25) can be simplified to be represented as follows.

$\Phi_{t0}=T\Phi_{t0-1}$ (26)

$\Phi_{t0}$ is a column vector of $\Phi_{t0}=(\Phi_{t0}(S_1), \Phi_{t0}(S_2), \ldots, \Phi_{t0}(S_M))$. $\Phi_{t0-1}$ is a column vector of $\Phi_{t0-1}=(\Phi_{t0-1}(S_1), \Phi_{t0-1}(S_2), \ldots, \Phi_{t0-1}(S_M))$. T is the transition probability matrix.

For example, the generation probabilities of the SDRs belonging to the respective clusters at the respective times from t=1 to t=n are as follows.

$\Phi_1=T\Phi_0: \Phi_2=T\Phi_1: \Phi_n=T\Phi_{n-1}$ (27)

At this time, the generation probabilities of the SDRs belonging to the respective clusters at an arbitrary time can be represented as follows by using the transition probability matrix T.

$\Phi_n=T^n\Phi_0$ (28)

If expression (28) is used, the generation probabilities of the SDRs belonging to the respective clusters at an arbitrary time can be calculated from each of the generation probability distributions of plural times previous to this time.

Figure 18:
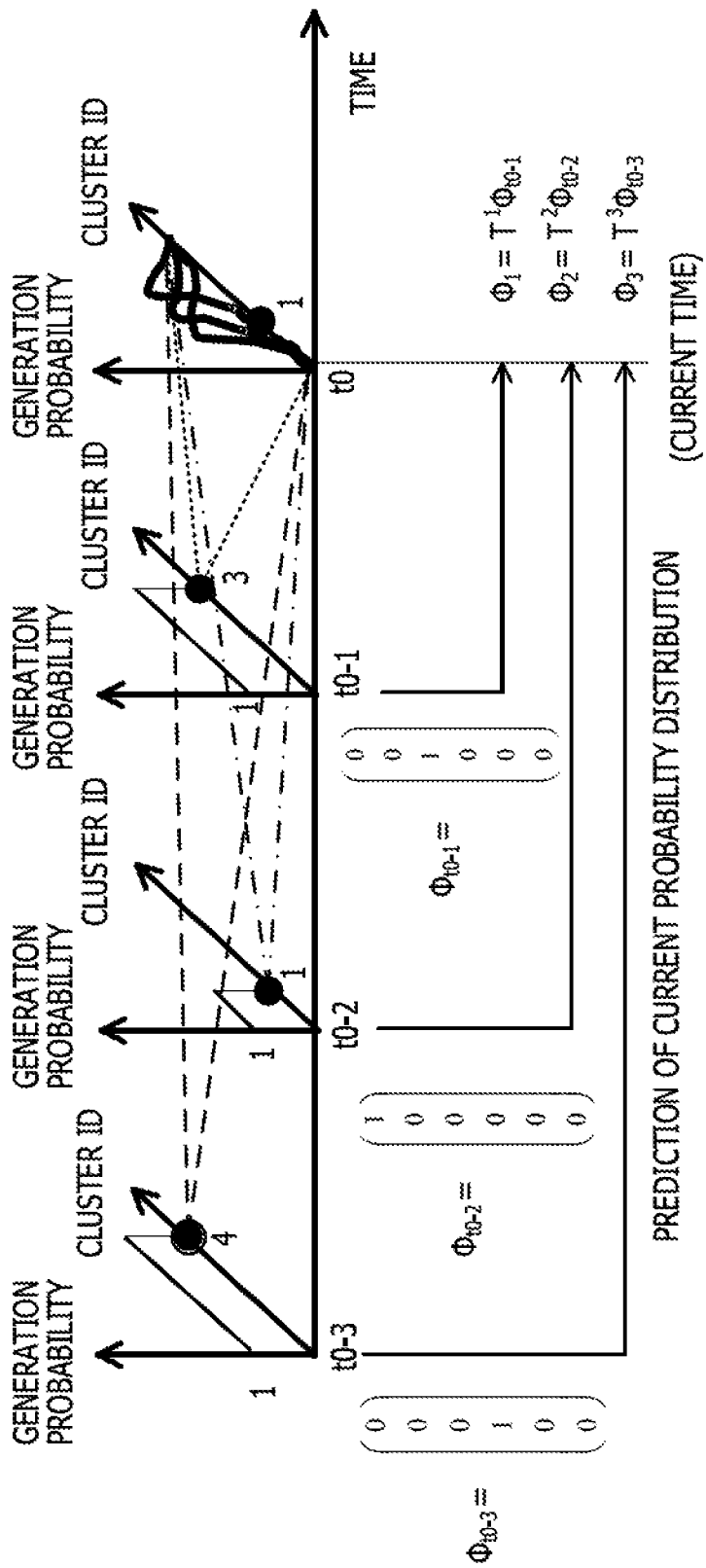
FIG. 18 is a diagram illustrating a calculation example of generation probabilities by use of a transition probability matrix.

FIG. 18 is a diagram illustrating a calculation example of the generation probabilities by use of the transition probability matrix. For example, the case is assumed in which it is determined that an SDR generated from an operation log collected at the time t=t0 belongs to the cluster with the cluster ID "1." In this case, the anomaly determining unit 180 calculates the generation probabilities of the SDRs belonging to the respective clusters at the time t=t0 on the basis of the clusters to which SDRs based on operation logs by past several times of collection belong.

In the example of FIG. 18, the SDR generated from the three-times-before operation log (time: t0−3) belongs to the cluster ID "4." The SDR generated from the two-times-before operation log (time: t0−2) belongs to the cluster ID "1." The SDR generated from the one-time-before operation log (time: t0−1) belongs to the cluster ID "3."

Regarding the generation probabilities $\Phi_{t0-3}$ of the SDRs at the time t0−3, the anomaly determining unit 180 sets the generation probability of the cluster with the cluster ID "4" to "1" and sets the generation probabilities of the other clusters to "0" and represents the generation probabilities $\Phi_{t0-3}$ by a vector. Then, the anomaly determining unit 180 multiplies the generation probabilities $\Phi_{t0-3}$ by the transition probability matrix T from the left three times. Thereby, generation probabilities $\Phi_3$ of the SDRs belonging to the respective clusters at the current time t0 are obtained.

Similarly, regarding the generation probabilities $\Phi_{t0-2}$ of the SDRs at the time t0−2, the anomaly determining unit 180 sets the generation probability of the cluster with the cluster ID "1" to "1" and sets the generation probabilities of the other clusters to "0" and represents the generation probabilities $\Phi_{t0-2}$ by a vector. Then, the anomaly determining unit 180 multiplies the generation probabilities $\Phi_{t0-2}$ by the transition probability matrix T from the left two times. Thereby, generation probabilities $\Phi_2$ of the SDRs belonging to the respective clusters at the current time t0 are obtained.

Moreover, regarding the generation probabilities $\Phi_{t0-1}$ of the SDRs at the time t0−1, the anomaly determining unit 180 sets the generation probability of the cluster with the cluster ID "3" to "1" and sets the generation probabilities of the other clusters to "0" and represents the generation probabilities $\Phi_{t0-1}$ by a vector. Then, the anomaly determining unit 180 multiplies the generation probabilities $\Phi_{t0-1}$ by the transition probability matrix T from the left one time. Thereby, generation probabilities $\Phi_1$ of the SDRs belonging to the respective clusters at the current time t0 are obtained.

In this manner, three kinds of generation probabilities of the SDRs belonging to the respective clusters at the current time t0 are calculated. The time-series anomaly score is calculated by using these generation probabilities.

The generation probabilities of the cluster ID "id" calculated by using the transition probability matrix from the time points obtained by tracing back from the current time by "$\tau \times \Delta t$" ($\tau$=1, 2, . . . , $\tau$max) are defined as $\Phi_1(id)$, $\Phi_2(id)$, . . . , $\Phi\tau_{max}(id)$. $\Delta t$ is the obtainment interval of the operation log for example. At this time, the time-series anomaly score can be calculated by the following expression for example.

$$Ass(id)=N(F(\text{Eval}(\Phi_1(id),\Phi_2(id),\ldots\Phi\tau_{max}(id)))) \quad (29)$$

Here, "Eval($x_1$, $x_2$, . . . $x\tau_{max}$)" is a transition probability evaluation function. F(x) is a filter function for highlighting the result of the transition probability evaluation function. N(x) is a normalization function for causing the anomaly value to fall within a range of 0 to 1. For example, the time-series anomaly score can be calculated by the following calculation expression.

$$\text{Eval}(x_1,\ldots,x\tau_{max})=A_1\times\text{Rank}(x_1)+A_2\times\text{Rank}(x_2)+\ldots+A\tau_{max}\times\text{Rank}(x\tau_{max}) \quad (30)$$

$$F(x)=x \quad (31)$$

$$N(x)=x/(\tau\text{max}\times\text{IDmax}) \quad (32)$$

$A_1$, . . . , $A\tau_{max}$ in expression (30) are constants representing weights. For example, $A_1$=1, $A_2$=½, $A_3$=⅓, . . . , $A\tau_{max}$=1/$\tau$max are set. By carrying out weighting in this manner, a higher weighting is given when the time point is closer to the current time and a lower weighting is given when the extent of tracing back to the past is larger. This causes the generation probability based on the state at the time point closer to the current time to have a higher degree of influence on the time-series anomaly score. The generation probability based on the state at the time point closer to the current time has higher reliability than the generation probability based on the state at the time point remoter from the current time. Therefore, the time-series anomaly score having high reliability can be calculated by carrying out such a weighting.

Rank(x) of expression (30) is the rank of id sorted in descending order of the value of x. When expression (30) is applied to expression (29), for example "Rank($x_1$)" becomes "Rank($\Phi_1$(id))." "Rank($\Phi_1$(id))" is the rank of "$\Phi_1$(id)" when "$\Phi_1$(id), $\Phi_2$(id), . . . , $\Phi\tau_{max}$(id)" are sorted in descending order on the basis of the values thereof. Expression (31) is a function that outputs an input value as it is. "IDmax" of expression (32) is the maximum value of the cluster ID.

The time-series anomaly score can be calculated by such calculation expressions.

It is also possible for the anomaly determining unit 180 to calculate an anomaly score obtained by integrating the state anomaly score and the time-series anomaly score (state-and-time-series anomaly score). The state-and-time-series anomaly score is represented by the following expression for example through expansion of the time-series anomaly score.

$$Ass(id)=N(F(\text{Eval}(\Phi_0(id),\Phi_1(id),\Phi_2(id),\ldots,\Phi\tau_{max}(id)))) \quad (33)$$

"$\Phi_0$(id)" of expression (33) is the generation probability "P(id, t)" of the cluster ID "id" at the current time, indicated in the generation probability information 151*a*. "Eval($x_0$, $x_1$, $x_2$, . . . $x\tau_{max}$)" is an evaluation function. F(x) is a filter function for highlighting the result of the evaluation function. N(x) is a normalization function for causing the anomaly value to fall within a range of 0 to 1.

In this manner, the generation probability P(id, t) at the current time can be included and the state-and-time-series anomaly score can be calculated on the basis of the generation probabilities each calculated from a respective one of the "$\tau$max+1" time points.

Next, the procedure of the anomaly determination processing will be described.

Figure 19:
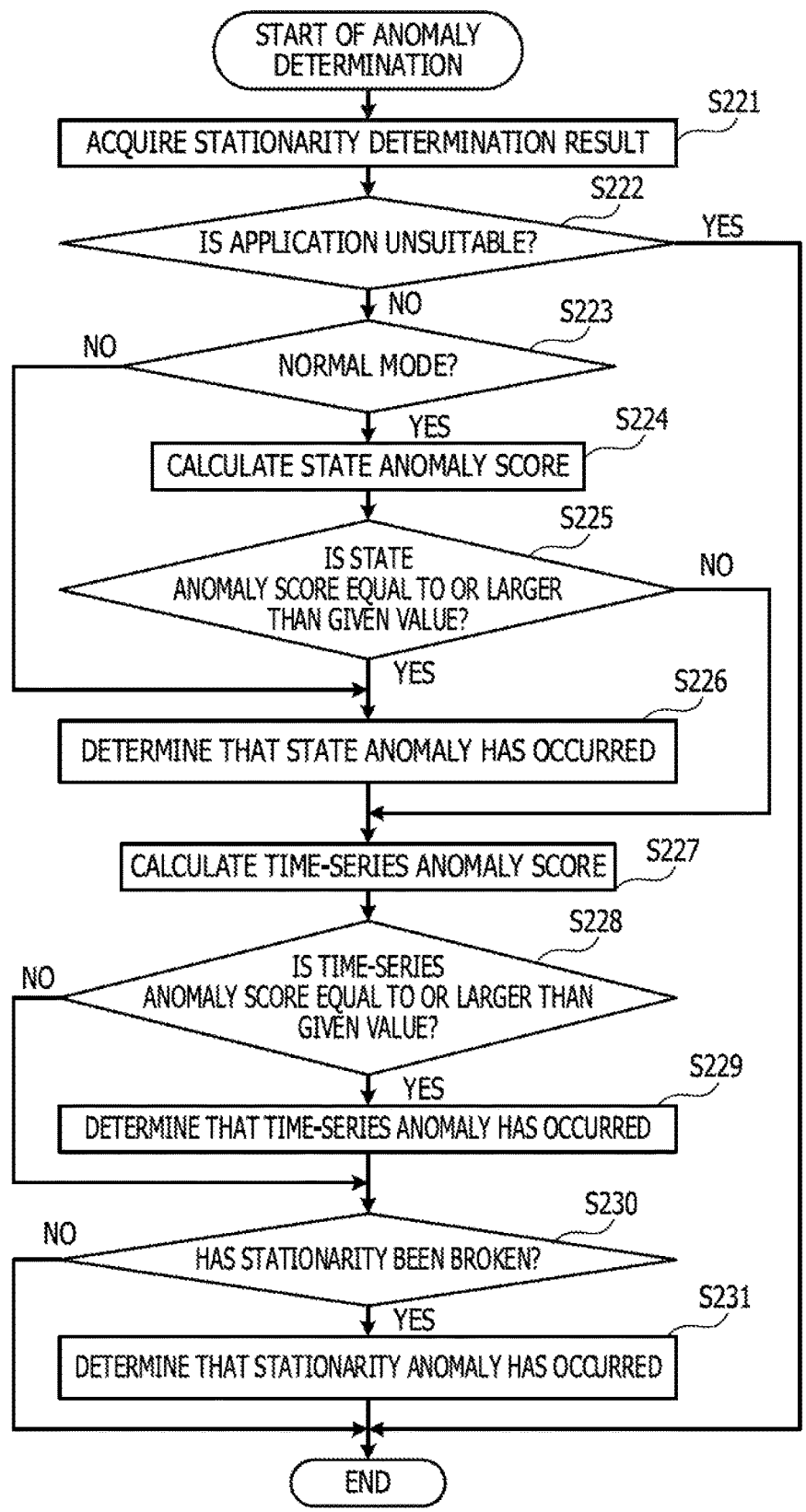
FIG. 19 is a flowchart illustrating one example of a procedure of anomaly determination processing.

FIG. 19 is a flowchart illustrating one example of the procedure of the anomaly determination processing. The processing illustrated in FIG. 19 will be described below along the step numbers.

[Step S221] The anomaly determining unit 180 acquires the immediate and previous stationarity determination results from the stationarity determining unit 170. In the stationarity determination result, information on whether or not the T-stationarity exists, whether or not the P-stationarity exists, whether application of the anomaly determination is unsuitable, and whether the operation mode is the non-periodic mode or the normal mode is included for example.

[Step S222] The anomaly determining unit 180 determines whether or not application of the anomaly determination is suitable on the basis of the immediate stationarity determination result. If application of the anomaly determination is suitable, the processing is advanced to a step S223. If application of the anomaly determination is unsuitable, the anomaly determination processing ends.

[Step S223] The anomaly determining unit 180 determines whether or not the operation mode is the normal mode on the basis of the immediate stationarity determination result. If the operation mode is the normal mode, the processing is advanced to a step S224. If the operation mode is the non-periodic mode, the processing is advanced to a step S226.

[Step S224] The anomaly determining unit 180 calculates the state anomaly score on the basis of the generation probability information 151*a*.

[Step S225] The anomaly determining unit 180 determines whether or not the state anomaly score is equal to or larger than a given value. If the state anomaly score is equal to or larger than the given value, the processing is advanced to the step S226. If the state anomaly score is smaller than the given value, the processing is advanced to a step S227.

[Step S226] The anomaly determining unit 180 determines that a state anomaly has occurred.

[Step S227] The anomaly determining unit 180 calculates the time-series anomaly score on the basis of the transition probability matrix 151*b*.

[Step S228] The anomaly determining unit 180 determines whether or not the time-series anomaly score is equal to or larger than a given value. If the time-series anomaly score is equal to or larger than the given value, the processing is advanced to a step S229. If the time-series anomaly score is smaller than the given value, the processing is advanced to a step S230.

[Step S229] The anomaly determining unit 180 determines that a time-series anomaly has occurred.

[Step S230] The anomaly determining unit 180 determines whether or not a deviation from the stationarity has occurred. For example, the anomaly determining unit 180 determines that a deviation from the stationarity has occurred if it is determined that the stationarity does not exist in the stationarity determination of the present time although the stationarity existed in the stationarity determination of the previous time regarding the T-stationarity or the P-stationarity. If a deviation from the stationarity has occurred, the processing is advanced to a step S231. If a deviation from the stationarity has not occurred, the anomaly determination processing ends.

[Step S231] The anomaly determining unit 180 determines that a stationarity anomaly has occurred.

In this manner, detection of an anomaly is enabled on the basis of which cluster the SDR representing the state of the system 30 belongs to. The detection status of the anomaly is displayed on the monitor 21 by the visualizing unit 190.

Figure 20:
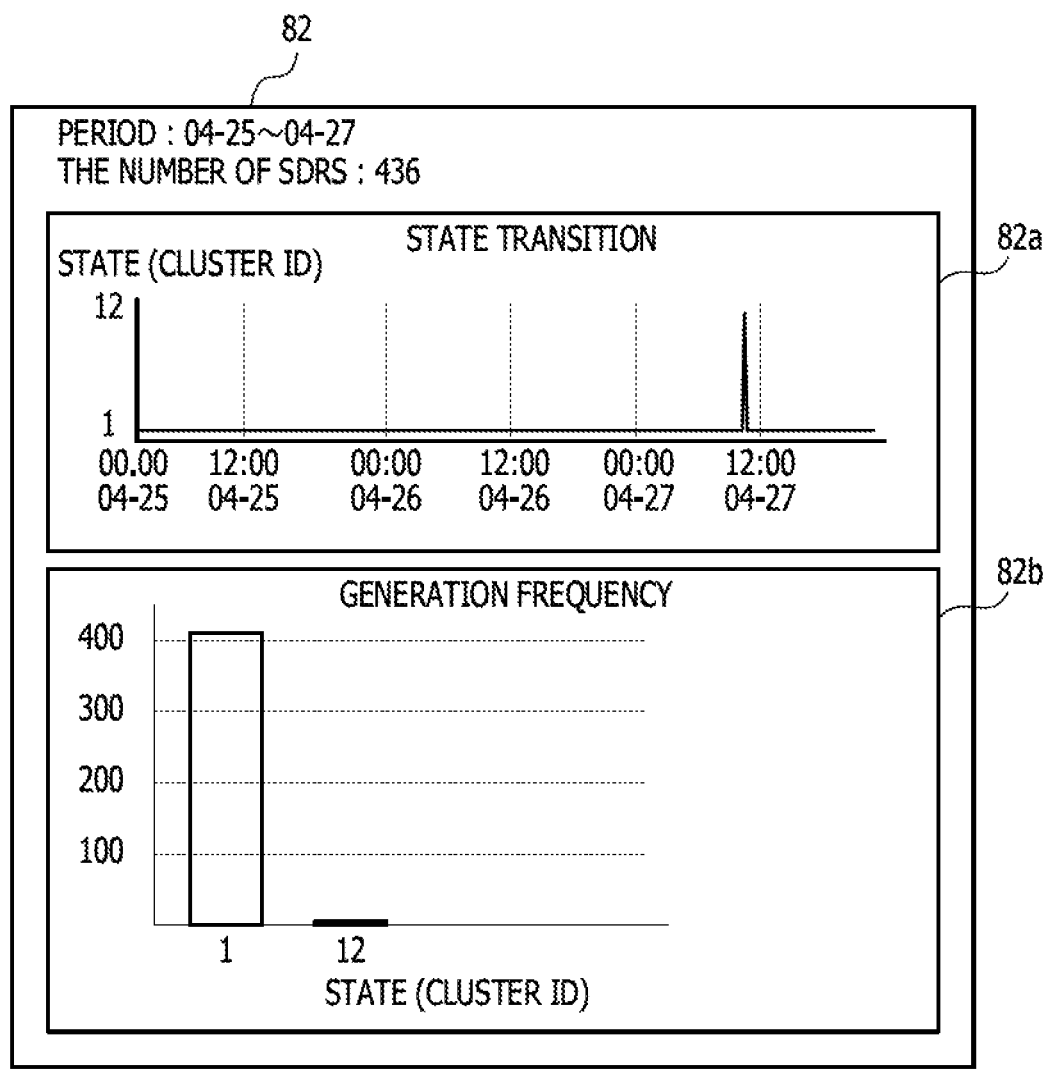
FIG. 20 is a diagram illustrating one example of visualization of an anomaly occurrence status.

FIG. 20 is a diagram illustrating one example of visualization of an anomaly occurrence status. In the example of FIG. 20, the cluster ID of the cluster to which a generated SDR belongs is employed as the state of the system 30. In a visualization screen 82, a state transition display unit 82*a* and a state distribution display unit 82*b* are set.

In the state transition display unit 82*a*, the time transition of the cluster ID of the cluster to which the SDR indicating the state of the system 30 belongs is indicated by a line graph. In the example of FIG. 20, the state of the cluster ID "1" continues but an SDR belonging to the cluster with the cluster ID "12" is generated only once before 12:00 on April 27.

In the state distribution display unit 82*b*, the generation frequency of the cluster ID indicating the state is illustrated by a bar graph. In the example of FIG. 20, the SDR belonging to the cluster with the cluster ID "1" is generated 400 times or more, whereas the SDR belonging to the cluster with the cluster ID "12" is generated only once.

Whether such transition status and generation frequency of the cluster ID of the cluster to which the SDR belongs are an anomaly can be determined on the basis of the anomaly score. For example, the visualizing unit 190 displays the time transition of the anomaly score and visualizes whether or not the occurrence of an anomaly is present.

Figure 21:
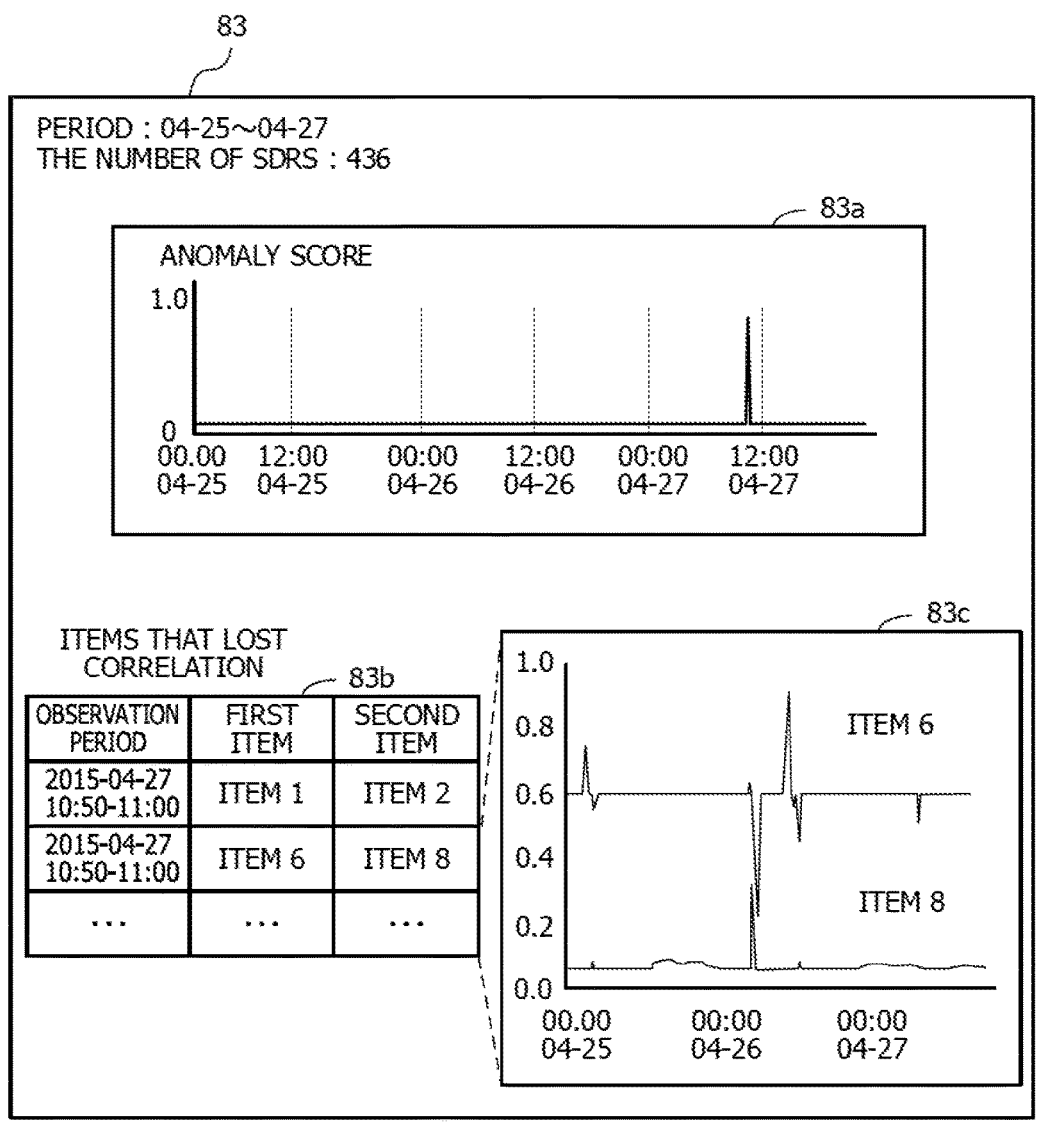
FIG. 21 is a diagram illustrating one example of visualization of an anomaly score.

FIG. 21 is a diagram illustrating one example of visualization of an anomaly score. In a visualization screen 83, an anomaly score display unit 83*a*, a display unit 83*b* of items that lost a correlation, and an item value display unit 83*c* are set.

In the anomaly score display unit 83*a*, the time transition of the value of the anomaly score (state anomaly or time-series anomaly) is represented by a line graph. In the example of FIG. 21, the anomaly score takes a high value only once before 12:00 on April 27. From this graph, it can be understood that an anomaly occurred before 12:00 on April 27.

In the display unit 83*b* of items that lost a correlation, in association with the observation period, pairs of items (first item and second item) between which a correlation existed before but the correlation disappeared in the period are displayed.

In the item value display unit 83*c*, time change of the value about each of the two items of the item pair that lost a correlation is indicated by a line graph. Comparing the changes in the values allows the administrator to understand the condition of the loss of the correlation.

Furthermore, it is also possible for the visualizing unit 190 to display change in the value of each of plural performance items on a screen.

Figure 22:
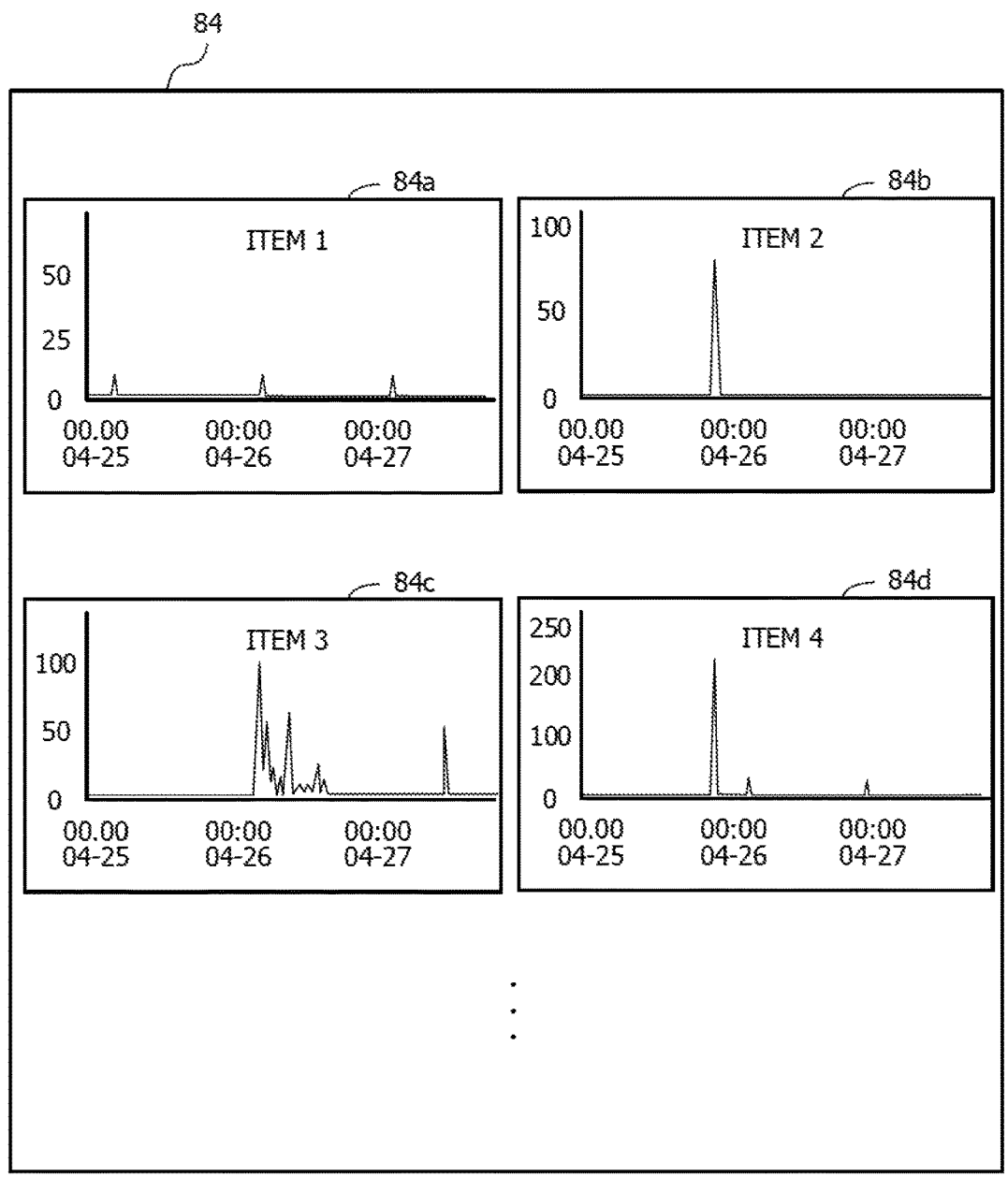
FIG. 22 is a diagram illustrating one example of visualization of performance items.

FIG. 22 is a diagram illustrating one example of visualization of performance items. In the example of FIG. 22, plural performance item display units 84*a*, 84*b*, 84*c*, 84*d*, . . . are set in a visualization screen 84. In each of the performance item display units 84*a*, 84*b*, 84*c*, 84*d*, . . . , time change of the value of an item is indicated.

By carrying out the visualization as illustrated in FIG. 20 to FIG. 22, the operating status of the system 30 can be easily understood and whether or not the occurrence of an anomaly is present can also be easily recognized.

Although the embodiments are exemplified above, the configurations of the respective units represented in the embodiments can be replaced by other elements having similar functions. Furthermore, other arbitrary constituents or steps may be added. Moreover, an element obtained by combining arbitrary two or more configurations (characteristics) in the above-described embodiments may be employed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for detecting an anomaly in a computer system, the method comprising:
    generating a plurality of pieces of correlation information based on correlations between changes in each item in each of different pairs of items in a plurality of items per unit period of time in a time series, each item relating to at least one of an operation, a performance, or a load in the computer system, each of the plurality of pieces of correlation information being generated for the plurality of items in one unit period of time in the time series;
    clustering the plurality of pieces of correlation information into a plurality of clusters, each cluster representing a state of the computer system and including a subset of the plurality of pieces of correlation information meeting a threshold for similarity;
    generating transition probabilities between each pair of the plurality of clusters; and
    determining the anomaly in the computer system based on the transition probability from one of the plurality of clusters in a first unit period of time to another one of the plurality of clusters in a second unit period of time.

2. The method according to claim 1, wherein each of the transition probabilities is a ratio of a number of times of generation of one of the clusters in a pair of the plurality of clusters as a transition destination to a total number of times of generation of the other one of the clusters in the pair of the plurality of clusters as a transition source among all pairs of the plurality of clusters.

3. The method according to claim 1, further comprising:
    calculating an evaluation value from a plurality of transition probabilities, each of the plurality of transition probabilities being the transition probability from each respective first cluster in each of a plurality of first unit periods of time in the time series to a second cluster in the second unit period of time, the second unit period of time being later than the plurality of first unit periods of time, and
    wherein the determining determines the anomaly in the computer system using the evaluation value calculated from the plurality of transition probabilities.

4. The method according to claim 3, wherein the calculating of the evaluation value uses a weighting for each of the plurality of transition probabilities, the weighting being a higher weighting when a time difference between one of the plurality of first unit periods of time and the second unit period of time is smaller.

5. The method according to claim 1, wherein the plurality of pieces of correlation information and the plurality of clusters are stored as learned information in a preliminary learning mode.

6. The method according to claim 5, further comprising:
    updating the learned information based on a new piece of correlation information obtained during an online mode.

7. The method according to claim 6,
    wherein the clustering calculates a representative value for each of the plurality of clusters based on at least one piece of correlation information included in the cluster, and
    wherein the threshold for similarity is met for the clustering to include the new piece of correlation information into one of the plurality of clusters whose representative value does not change upon addition of the new piece of correlation information into the one of the plurality of clusters.

8. A non-transitory computer readable medium storing a computer-executable program causing a computer to execute a process, the process comprising:
    generating a plurality of pieces of correlation information based on correlations between changes in each item in each of different pairs of items in a plurality of items per unit period of time in a time series, each item relating to at least one of an operation, a performance, or a load in a computer system, each of the plurality of pieces of correlation information being generated for the plurality of items in one unit period of time in the time series;
    clustering the plurality of pieces of correlation information into a plurality of clusters, each cluster representing a state of the computer system and including a subset of the plurality of pieces of correlation information meeting a threshold for similarity;
    generating transition probabilities between each pair of the plurality of clusters; and
    determining an anomaly in the computer system based on the transition probability from one of the plurality of clusters in a first unit period of time to another one of the plurality of clusters in a second unit period of time.

9. The non-transitory computer readable medium according to claim 8, wherein each of the transition probabilities is a ratio of a number of times of generation of one of the clusters in a pair of the plurality of clusters as a transition destination to a total number of times of generation of the other one of the clusters in the pair of the plurality of clusters as a transition source among all pairs of the plurality of clusters.

10. The non-transitory computer readable medium according to claim 8, the process further comprising:
    calculating an evaluation value from a plurality of transition probabilities each of the plurality of transition probabilities being the transition probability from each respective first cluster in each of a plurality of first unit periods of time in the time series to a second cluster in the second unit period of time, the second unit period of time being later than the plurality of first unit periods of time, and
    wherein the determining determines the anomaly in the computer system using the evaluation value calculated from the plurality of transition probabilities.

11. The non-transitory computer readable medium according to claim 10, wherein the calculating of the evaluation value uses a weighting for each of the plurality of transition probabilities, the weighting being a higher weighting when a time difference between one of the plurality of first unit periods of time and the second unit period of time is smaller.

12. The non-transitory computer readable medium according to claim 8, wherein the plurality of pieces of correlation information and the plurality of clusters are stored as learned information in a preliminary learning mode.

13. The non-transitory computer readable medium according to claim 12, the process further comprising:
    updating the learned information based on a new piece of correlation information obtained during an online mode.

14. The non-transitory computer readable medium according to claim 13, wherein the clustering calculates a representative value for each of the plurality of clusters based on at least one piece of correlation information included in the cluster, and wherein the threshold for similarity is met for the clustering to include the new piece of correlation information into one of the plurality of clusters whose representative value does not change upon addition of the new piece of correlation information into the one of the plurality of clusters.

15. An information processing device comprising:
a memory; and
a processor coupled to the memory and configured to:
  generate a plurality of pieces of correlation information based on correlations between changes in each item in each of different pairs of items in a plurality of items per unit period of time in a time series, each item relating to at least one of an operation, a performance, or a load in a computer system, each of the plurality of pieces of correlation information being generated for the plurality of items in one unit period of time in the time series,
  cluster the plurality of pieces of correlation information into a plurality of clusters, each cluster representing a state of the computer system and including a subset of the plurality of pieces of correlation information meeting a threshold for similarity,
  generate transition probabilities between each pair of the plurality of clusters, and
  determine an anomaly in the computer system based on the transition probability from one of the plurality of clusters in a first unit period of time to another one of the plurality of clusters in a second unit period of time.

16. The information processing device according to claim 15, wherein each of the transition probabilities is a ratio of a number of times of generation of one of the clusters in a pair of the plurality of clusters as a transition destination to a total number of times of generation of the other one of the clusters in the pair of the plurality of clusters as a transition source among all pairs of the plurality of clusters.

17. The information processing device according to claim 15,
wherein the processor is further configured to calculate an evaluation value from a plurality of transition probabilities, each of the plurality of transition probabilities being the transition probability from each respective first cluster in each of a plurality of first unit periods of time in the time series to a second cluster in the second unit period of time, the second unit period of time being later than the plurality of first unit periods of time, and wherein the processor is configured to determine the anomaly in the computer system using the evaluation value calculated from the plurality of transition probabilities.

18. The information processing device according to claim 17, wherein the processor is configured to calculate the evaluation value using a weighting for each of the plurality of transition probabilities, the weighting being a higher weighting when a time difference between one of the plurality of first unit periods of time and the second unit period of time is smaller.

19. The information processing device according to claim 15,
wherein the memory stores the plurality of pieces of correlation information and the plurality of clusters as learned information in a preliminary learning mode of the computer system, and wherein the processor is further configured to update the learned information based on a new piece of correlation information obtained during an online mode of the computer system.

20. The information processing device according to claim 19,
wherein the processor is configured to cluster by calculating a representative value for each of the plurality of clusters based on at least one piece of correlation information included in the cluster, and wherein the threshold for similarity is met to include the new piece of correlation information into one of the plurality of clusters whose representative value does not change upon addition of the new piece of correlation information into the one of the plurality of clusters.

* * * * *